(12) United States Patent  
Toma et al.

(10) Patent No.: US 7,876,477 B2  
(45) Date of Patent: Jan. 25, 2011

(54) IMAGE READING METHOD AND IMAGE EXPANSION METHOD

(75) Inventors: Tadamasa Toma, Osaka (JP); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/819,683

(22) Filed: Jun. 28, 2007

(65) Prior Publication Data

US 2008/0002239 A1    Jan. 3, 2008

(30) Foreign Application Priority Data

Jun. 28, 2006    (JP)    .............................. 2006-177628

(51) Int. Cl.  
*H04N 1/04* (2006.01)

(52) U.S. Cl. ................ 358/474; 358/497; 358/475; 358/486; 382/275; 382/274; 345/646

(58) Field of Classification Search ............... 358/474, 358/497, 496, 486, 501, 475, 409, 539, 509, 358/518, 530, 504, 500; 382/275, 274, 162, 382/167; 345/646, 660  
See application file for complete search history.

(56) References Cited

U.S. PATENT DOCUMENTS

| 6,005,587 | A  | * | 12/1999 | Takahashi et al. | ........... 715/733 |
| 6,603,514 | B1 | * | 8/2003  | Tsai et al.      | ............ 348/345 |
| 6,737,361 | B2 | * | 5/2004  | Yoo              | ............ 438/758 |
| 6,985,634 | B2 | * | 1/2006  | Matsuura et al.  | ............ 382/248 |
| 6,985,641 | B1 | * | 1/2006  | Michel et al.    | ............ 382/298 |
| 7,457,009 | B2 | * | 11/2008 | Oyama et al.     | ............ 358/483 |
| 7,515,312 | B2 | * | 4/2009  | Murakami et al.  | .......... 358/461 |
| 7,525,693 | B2 | * | 4/2009  | Matsumoto        | ................ 358/461 |

(Continued)

FOREIGN PATENT DOCUMENTS

JP    2000-339450    12/2000

OTHER PUBLICATIONS

Masayuki Tanaka et al., Kumiawase Gaso Kongou to Choukaizou Shori e no Ouyou (Multi-mixture image and Its Application to Super-resolution) IEICE Technical Report PRMU 2005-274, the Institute of Electronics, Information and Communication Engineers, Mar. 2006 (English Abstract).

*Primary Examiner*—Negussie Worku  
(74) *Attorney, Agent, or Firm*—Wenderoth, Lind & Ponack, L.L.P.

(57) ABSTRACT

An image reading method and an image expansion method are provided whereby a low-resolution imaged picture can be expanded to have a high image quality even if an input image sequence is motionless, that is to say, even if a subject is motionless. An image expansion device has an image input unit, which shoots an input image, a reading position determination unit, which determines the reading position of a mixed image and a decimated image, an image reading unit, which reads the mixed image and the decimated image at the reading position from the input image, a positioning unit, which positions a plurality of mixed images to calculate a motion vector indicating the amount of displacement among the images, a displacement compensation unit, which compensates for the motion vector based on the amount of movement of the reading position, and an image expansion unit, which uses a plurality of decimated images to perform super-resolution reconstruction, based on the post-compensation motion vector, and expands the image.

12 Claims, 19 Drawing Sheets

U.S. PATENT DOCUMENTS

| | | | |
|---|---|---|---|
| 7,671,900 B2 * | 3/2010 | Asada | 348/223.1 |
| 7,688,488 B2 * | 3/2010 | Kobayashi | 358/514 |
| 2003/0038853 A1 * | 2/2003 | Moroo | 347/15 |
| 2004/0100667 A1 * | 5/2004 | Oyama et al. | 358/484 |
| 2004/0169895 A1 * | 9/2004 | Hashizume et al. | 358/474 |
| 2004/0223194 A1 * | 11/2004 | Naito et al. | 358/497 |
| 2006/0023265 A1 * | 2/2006 | Yoon | 358/474 |
| 2006/0132849 A1 * | 6/2006 | Kakutani | 358/3.06 |
| 2006/0285637 A1 * | 12/2006 | Varjonen et al. | 378/62 |
| 2007/0091338 A1 * | 4/2007 | Asada | 358/1.9 |
| 2009/0015880 A1 * | 1/2009 | Liu | 358/474 |
| 2009/0207462 A1 * | 8/2009 | Arimoto et al. | 358/509 |
| 2010/0123745 A1 * | 5/2010 | Nakaya et al. | 347/9 |

* cited by examiner

FIG. 5
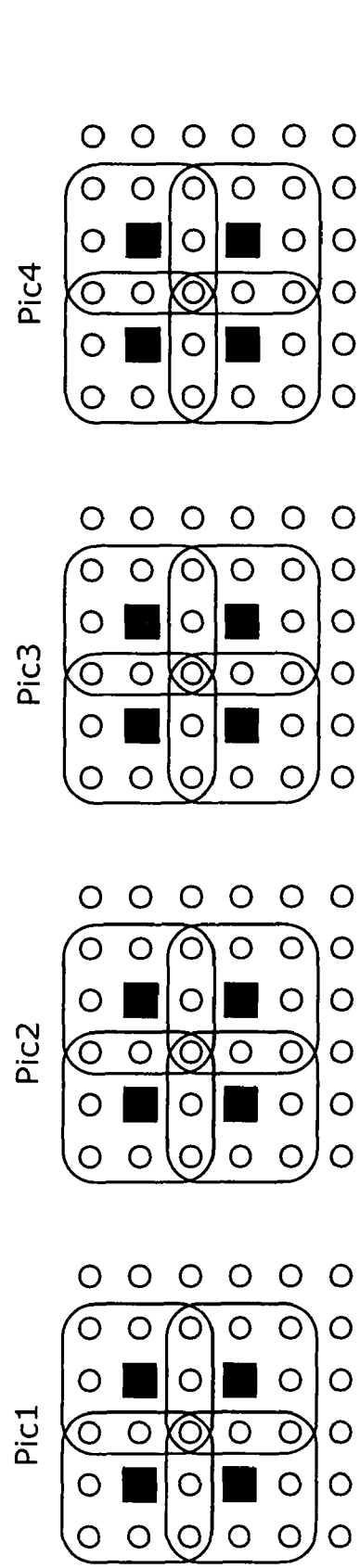
(a)
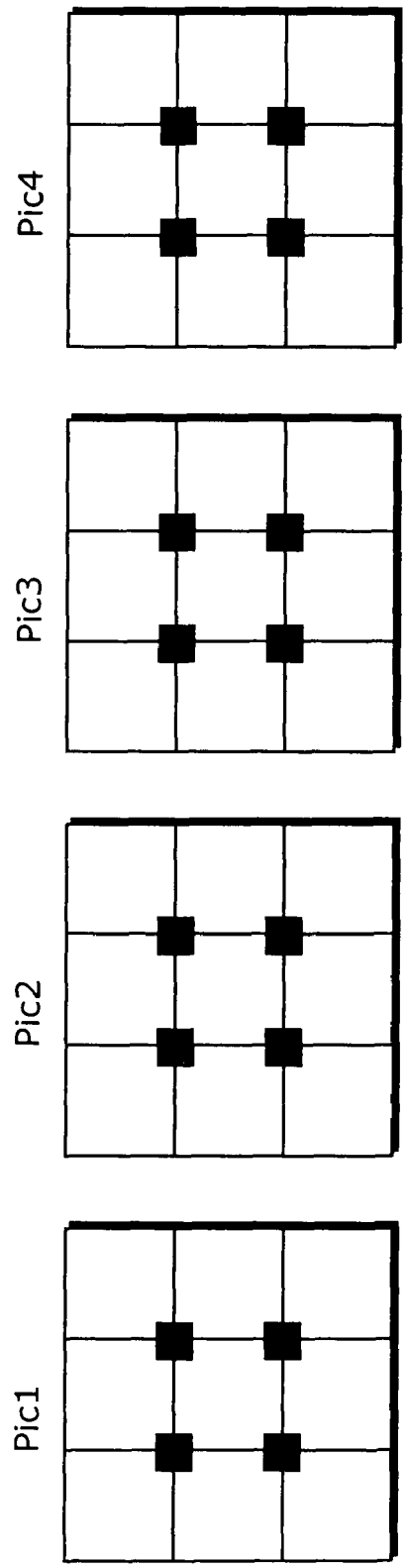
(b)
■ : Discrete point of mixed image

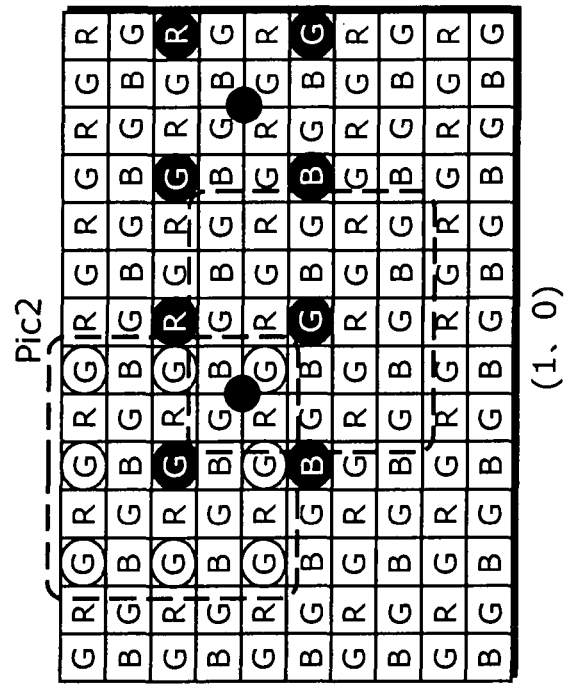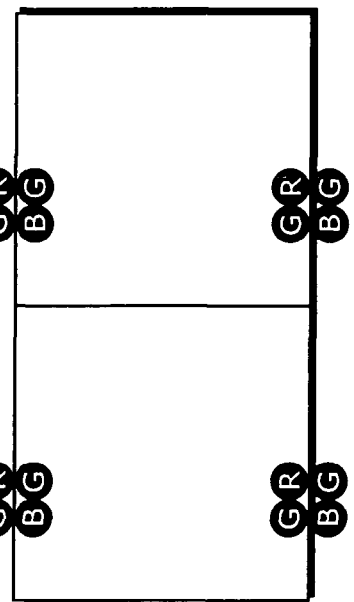
FIG. 12A
Shift vector: (0, 0)    (1, 0)
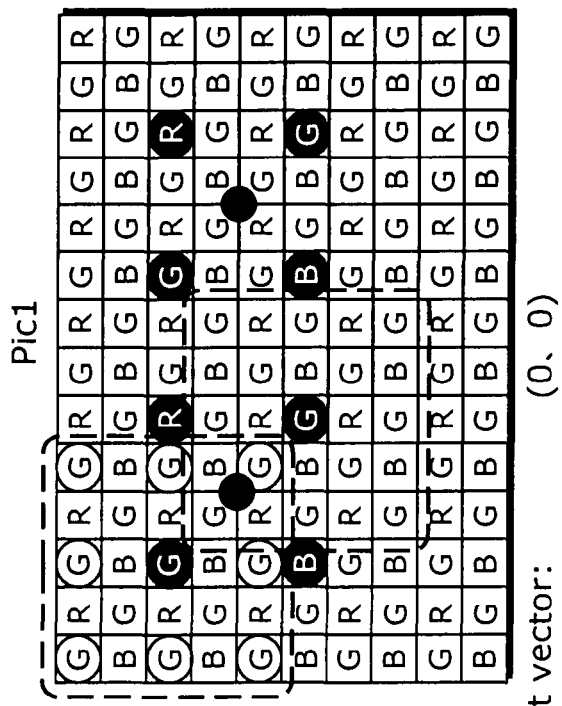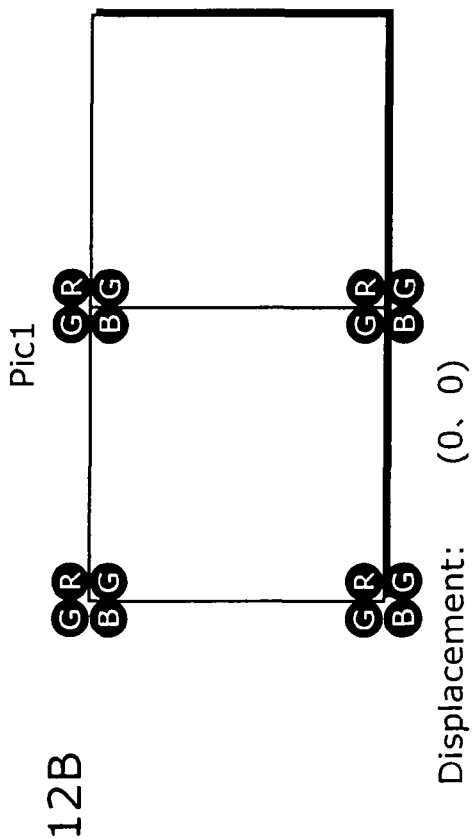
FIG. 12B
Displacement: (0, 0)    (1/3, 0)

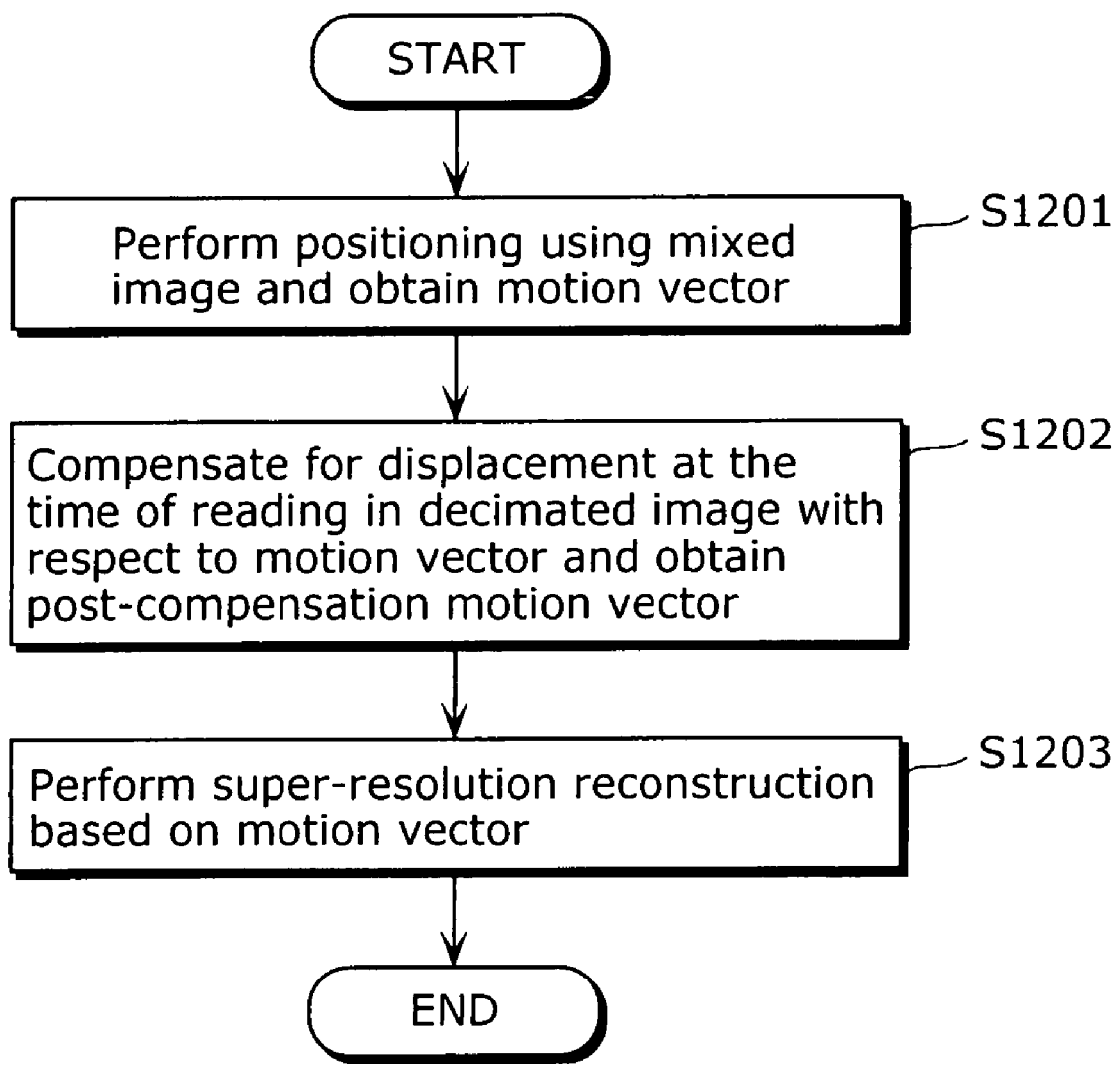

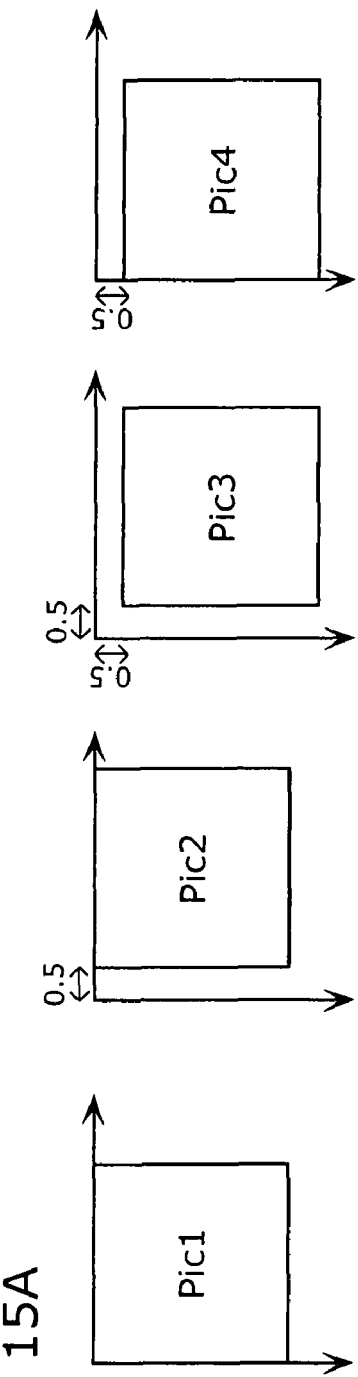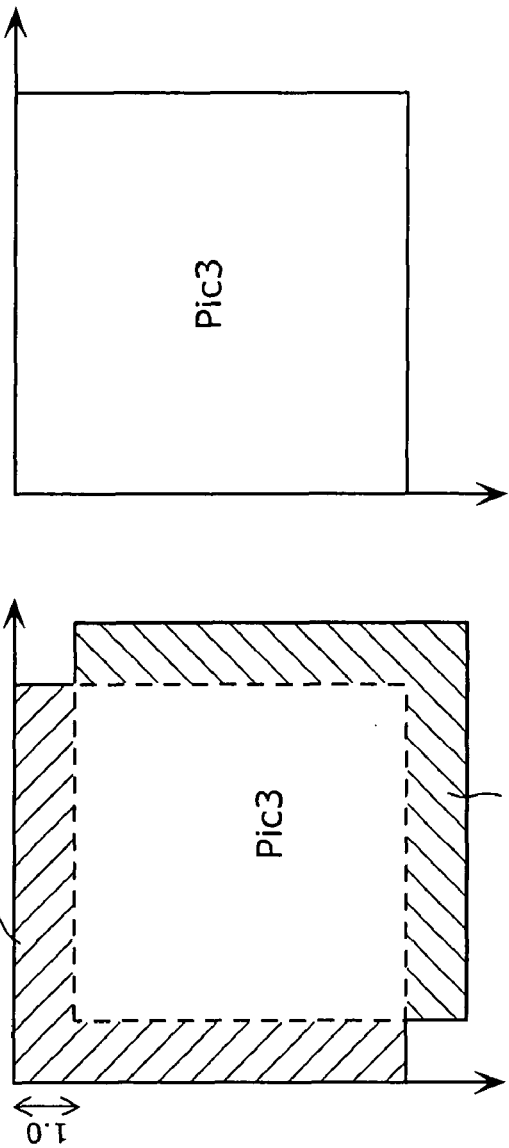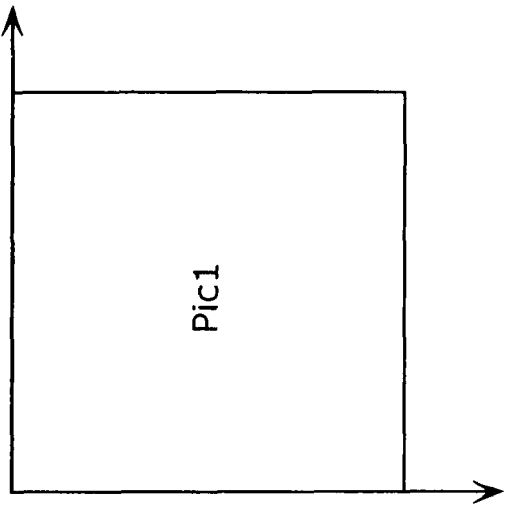
FIG. 15A
FIG. 15B
FIG. 15C

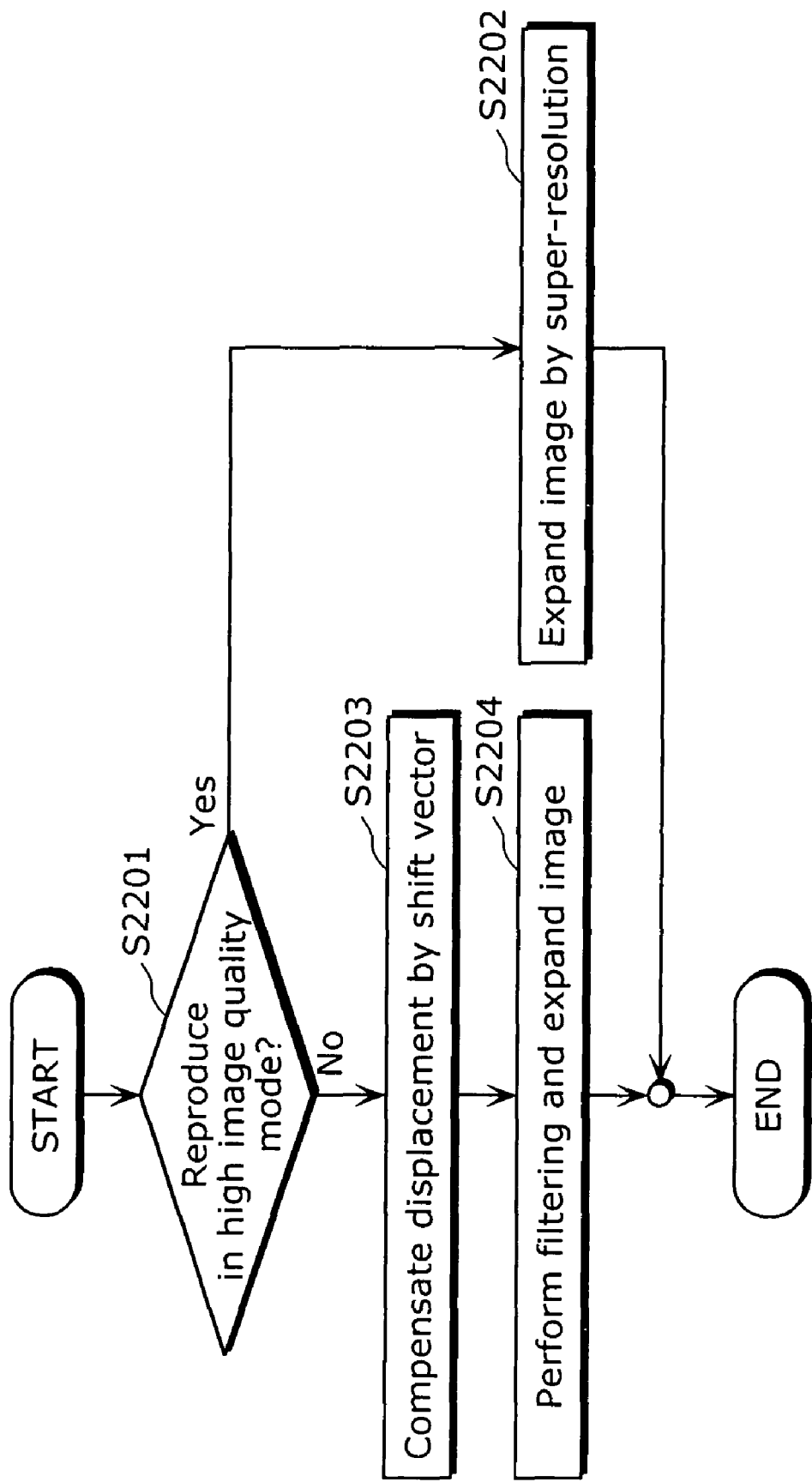

IMAGE READING METHOD AND IMAGE EXPANSION METHOD

BACKGROUND OF THE INVENTION (1) Field of the Invention

The present invention relates to an image reading method suitable for increasing image resolution and an image expansion method for expanding and reproducing a read image.

(2) Description of the Related Art

Recently, efforts have been actively made to enhance the resolution of moving pictures and still pictures shot by a digital still camera or the like for obtaining sharper images. As one of the efforts, a method whereby a plurality of images having displacement from one another are synthesized to restore high frequency components has been studied as a method for obtaining a sharp high-resolution image close to its original image. With this method, a plurality of images, which are temporally consecutive in a moving image, can be used to enhance the resolution, and this method may be applicable for a wide range of uses, such as enhancement of the resolution of a moving image shot by a digital still camera and a video camera. Hereinafter, processing whereby a high-resolution image is generated from a plurality of low-resolution images having displacement from one another is referred to as super-resolution.

Although there are a number of super-resolution techniques, reconstruction type super-resolution is widely used whereby the pixel value of the high-resolution image is sequentially updated by repetitive processing in order to stably obtain a high-quality and high-resolution image. An example of reconstruction type super-resolution is a Maximum A Posteriori (MAP) method (see, e.g., Japanese Unexamined Patent Application Publication 2000-339450). The MAP method is a method for performing reconstruction of a high-resolution image which maximizes a posterior probability when a high-resolution image generated by a bicubic method, a nearest neighbor method, or the like is taken as an initial value, and a plurality of low-resolution images, which are observed images, is the condition. A posteriori probability is indicated by a performance function, which is made of an error term and a convergent term. When the imaging model is assumed, the error term represents the square error between a pixel value estimated from a high-resolution image based on an imaging model, and a pixel value of an positioned low-resolution image, and the convergent term represents a constraint based on advance information such as an image is assumed to be smooth at all. Here, when a low-resolution image is sufficiently band-limited, super-resolution has less effect because a high-resolution image can be restored from the low-resolution image, therefore, it is preferable that the low-resolution image to which super-resolution is applied includes many high frequency components, in other words, aliasing components. Accordingly, it is important to satisfy the following two requirements in order to apply super-resolution.

A first requirement is that positioning between low-resolution images can be made accurately, and a second requirement is that strong aliasing exists in the low-resolution image.

On the other hand, it is difficult for a common digital still camera or the like to read a high-resolution image, which is shot by an imaging device, at a high frame rate due to processing power, therefore, pixel mixture or decimation reading is used as a method for reducing the amount of data to be read. In this case, since a high-resolution image is read as a low-resolution image, a technique whereby a low-resolution image after being read is expanded to have a high image quality by super-resolution receives attention. As an example, a method whereby super-resolution is performed using both a mixed image read by pixel mixture, and a decimated image read by decimation reading is described in Nonpatent document 1 ("Multi-mixture Imaging and Its Application to Super-resolution", PRMU2005-274 (2006-3)).

An image expansion method in the Nonpatent document 1 will be described below as a prior art example.

In a conventional image expansion method, two types of low-resolution images: a mixed image and a decimated image are read from an imaging device that can take a picture at high resolution. The mixed image is an image that is read after a plurality of pixels in a region to be read are mixed, and a decimated image is an image obtained by reading only one pixel among pixels within a given range. Here, since high frequency components are suppressed by pixel mixture in the mixed image, an effect of aliasing is suppressed. In an image where the effect of aliasing is suppressed, accurate positioning can be achieved. Meanwhile, strong aliasing is included in the decimated image. Accordingly, the mixed image can be used for positioning, and the decimated image can be used for super-resolution reconstruction to satisfy the two requirements needed for super-resolution.

FIG. 1 is a block diagram showing the configuration of an image expansion device 500 that performs a conventional image expansion method. As shown in FIG. 1, the image expansion device 500 has an image storage unit 510, an image reproducing unit 520, and a memory 530.

The image storage unit 510 is constituted by an imaging device such as Charge Coupled Devices (CCD) and Complementary Metal Oxide Semiconductor (CMOS), and has an image input unit 511, and an image reading unit 512. The image input unit 511 shoots an input image 501. The image reading unit 512 reads a decimated image 502 and a mixed image 503 from the input image 501, which is shot by the image input unit 511, and stores each image in the memory 530.

Meanwhile, the image reproducing unit 520 has a positioning unit 521 and an image expansion unit 522. The positioning unit 521 reads a plurality of mixed images 503 from the memory 530, positions the plurality of read mixed images 503 to calculate the amount of displacement among the images, and outputs the amount of displacement to the image expansion unit 522. Note that here the amount of displacement is represented by a motion vector 504. The image expansion unit 522 performs, based on the motion vector 504, which represents the amount of displacement, the super-resolution reconstruction to expand the image using a plurality of decimated images 502, which are read from the memory 530, and outputs an expanded image 505.

FIG. 2 is a flowchart showing the operation of the image storage unit 510, and FIGS. 3A and 3B are diagrams for describing a decimated image and a mixed image. FIG. 3A shows a decimated image, and FIG. B shows a mixed image.

First, as pixels in the decimated image, the image reading unit 512 reads pixel values at predetermined positions from the input image shot by the image input unit 511 (Step S0101). For example, as shown in FIG. 3A, when pixels are read at the rate of one pixel in every 4 pixels (indicated by black triangles in the figure), the decimated image is a low-resolution image, the resolution of which is ½ with respect to the input image 501. Then, the image reading unit 512 reads mixed pixels at the same positions as the reading positions of the decimated image from the input image 501 as pixels in the mixed image (Step S0102). For example, as shown in FIG. 3B, when pixel mixture is performed, and one pixel is calculated and read using nine pixels in an area 301, the center of the nine pixels is a discrete point (indicated by a black rectangle in the figure) of the mixed image, and the mixed image is a low-resolution image, the resolution of which is ½ with respect to the input image 501.

FIG. 4 is a flowchart showing the operation of the image reproducing unit 520.

First, the positioning unit 521 performs positioning using a plurality of mixed images to obtain the amount of displacement among images (Step S0201). Next, the image expansion unit 522 performs super-resolution reconstruction based on the motion vector 504, and expands the image (Step S0202).

However, in the conventional image expansion method, the reading positions of the mixed image and the decimated image are fixed. FIG. 5(*a*) is a diagram showing an example of pixel mixture in the conventional image expansion method. FIG. 5(*a*) shows an example that nine pixels are mixed, the center of the nine pixels to be mixed corresponding to the discrete point (indicated by a black rectangle in the figure) in the mixed image. When it is assumed that pictures from Pic1 to Pic4 in the figure represent four consecutive images (picture), the positions of the discrete points are equal in all the images. In this example, the mixed image is a low-resolution image, the resolution of which is ½ with respect to the input. Note that only part of the pixels in the picture is shown in the figure, and other pixels are omitted. FIG. 5(*b*) is a diagram showing the positions of the pixels in a coordinate of the read low-resolution image of the mixed image corresponding to the pictures from Pic1 to Pic4. It is clear that each grid shows the pixel positions of the low-resolution image, the discrete points in the mixed image always being mapped to the identical pixel positions in the pictures from Pic1 to Pic4. Note that, also in the decimated image, pixel values at fixed decimation positions were read.

As described above, in a conventional image expansion method, since the discrete points of the mixed image, and the decimation positions of the decimated image are fixed, no displacement is generated in the read mixed image and decimated image when an input image sequence is motionless. For super-resolution, when there is no displacement among low-resolution images, the effect is significantly lowered. As a result, in the conventional image expansion method, there is a problem that the effect of the super-resolution is significantly lowered when an input image sequence is motionless, in other words, when a subject is motionless.

SUMMARY OF THE INVENTION

Thus, the present invention is made in the light of the above situation, and an object of the present invention is to provide an image reading method and an image expansion method that can expand a low-resolution imaged picture to have a high image quality even if an input image sequence is motionless, in other words, even if a subject is motionless.

In order to achieve the above object, an image reading method according to the present invention is for reading a mixed image and a decimated image from an input image which is captured, the mixed image and the decimated image being used for super-resolution. The image reading method includes: determining a reading position of a reading pixel of the mixed image and the decimated image for each input image, so that the reading position moves differently for each input image; reading the mixed image from the input image according to the determined reading position, by mixing signals of adjacent pixels; and reading the decimated image from the input image according to the determined reading position, by selecting signals of spatially-separated pixels.

Accordingly, displacement can be generated among imaged pictures even if a subject is motionless, by reading the mixed image and the decimated image while displacing the position of the discrete point. Therefore, when an image is expanded to have high resolution using super-resolution, that is to say, using two types of low-resolution imaged pictures (mixed image and decimated image), for example even if the subject is motionless, the displacement generated when the image is read can be used to expand the low-resolution imaged picture to have a high image quality.

Here, the reading position may be determined in a cyclic manner starting from a reference position and returning to the reference position again after moving by one integer pixel at a time along a predetermined movement path.

Accordingly, the reading positions of the mixed image and the decimated image can be moved periodically.

Further, the image reading method may further include recording information indicating the determined reading position by associating the information with the read mixed image and decimated image.

Accordingly, the amount of movement of the reading positions of the mixed image and the decimated image can be obtained when the image is expanded to have high resolution.

Still further, the image reading method may further include: judging whether or not the input image is motionless; and determining the reading position so that the reading position is moved, only when it is judged that the input image is motionless.

Accordingly, since the reading position is moved as necessary, when an image is reproduced, for which no movement of the reading position was performed, compensation for the amount of movement of the reading position is unnecessary; thus the amount of processing can be reduced.

Moreover, an image expansion method according to the present invention is for outputting an expanded image by increasing resolution of an image, using a mixed image and a decimated image which are read from an input image which is captured. The image expansion method includes: determining, for each input image, a reading position of a reading pixel of the mixed image and the decimated image, so that the reading position moves differently for each input image; reading the mixed image from the input image according to the determined reading position, by mixing signals of adjacent pixels; and reading the decimated image from the input image according to the determined reading position, by selecting signals of spatially-separated pixels; calculating an amount of displacement between a plurality of the mixed images, by positioning the plurality of the mixed images; compensating for the amount of the displacement based on the amount by which the reading position is moved; and outputting an expanded image by increasing resolution of the image, by reconstructing a plurality of the decimated images by positioning the plurality of the decimated images based on the compensated amount of the displacement.

Accordingly, since displacement is generated among imaged pictures by reading the mixed image and the decimated image while displacing the position of the discrete point even if the subject is motionless, for example, using the displacement generated when the image is read even if the subject is motionless, the image can be expanded to have high resolution using two types of imaged pictures, the low-resolution mixed image and decimated image.

Here, the image expansion method may further include: selecting whether or not the image is to be expanded to have a high image quality; and (i) when it is selected that the image is to be expanded to have the high image quality, calculating an amount of displacement between a plurality of the mixed images, by positioning the plurality of the mixed images; compensating for the amount of the displacement based on the amount by which the reading position is moved; and outputting an expanded image by increasing resolution of the image by reconstructing a plurality of the decimated images by positioning the plurality of the decimated images based on the compensated amount of the displacement, and (ii) when it is not selected that the image is to be expanded to have the high image quality, outputting an expanded image by increasing resolution of the image using filtering.

Accordingly, since whether or not image expansion for a high image quality should be performed can be selected as necessary, an expansion result by super-resolution may be outputted when a high-quality expanded image is needed, and an expanded image for example by filtering, in which an operational load is low, may be outputted in other cases; thus it is possible to switch effectively between the output of a high image quality expanded image and the output of an expanded image with a low operational load.

Note that not only can the present invention be achieved as such an image reading method and an image expansion method, but also as an image reading device and an image expansion device that have as means characteristics steps included in such an image reading method and an image expansion method, and as a program causing a computer to execute these steps. In addition, needless to say, such a program can be delivered through a storage medium such as a CD-ROM, and a transmission medium such as the Internet.

As described above, according to the present invention, since displacement is generated among imaged pictures by reading the mixed image and the decimated image while displacing the position of the discrete point, even if the subject is motionless, for example, the displacement generated at the time of reading is used to expand the imaged picture to have a high image quality using two types of imaged pictures, the low-resolution mixed image and decimated image; thus the practical value is high.

Further Information about Technical Background to this Application

The disclosure of Japanese Patent Application No. 2006-177628 filed on Jun. 28, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3A shows a decimated image and FIG. 3B shows a mixed image;

FIG. 5 is a diagram showing an example of reading an image in the image storage unit of the conventional image expansion device, showing (a) an example of the pixel mixture, and (b) the positions of the pixels in the coordinate of the read mixed image;

FIG. 11A shows the basic unit of the bayer arrangement; FIG. 11B shows an example of mixture of nine pixels in the bayer arrangement; and FIG. 11C shows the pixel positions on the low-resolution image of the mixed pixels after the nine pixels are mixed;

FIGS. 12A and 12B are diagrams showing an example of reading an image with pixels in a bayer arrangement in the image storage unit of the first embodiment: FIG. 12A shows an example where the reading is performed while a reading position is being moved along a shift vector; and FIG. 12B shows the positions of the pixels on the low-resolution image after the pixels are mixed;

FIG. 13A shows the configuration of a stream; and FIG. 13B shows the configuration of a header;

FIG. 14 is a flowchart showing the operation of an image reproducing unit of the first embodiment;

FIGS. 15A to 15C are diagrams depicting a case where the amount of movement of the reading position is compensated after image expansion in the image reproducing unit of the first embodiment: FIG. 15A shows the amount of movement of the reading position of the decimated image; FIG. 15B shows position relationship among pictures after image expansion; and FIG. 15C shows a picture after the picture is moved to a reference position;

FIG. 19 is a flowchart showing the operation of an image reproducing unit of the third embodiment; FIG. 20A shows an example of a physical format of a flexible disk, which is a storage medium body; FIG. 20B shows the appearance of the flexible disk viewed from a front side, its cross-sectional configuration, and the flexible disk; and FIG. 15C shows the configuration for recording and reproducing the above program on the flexible disk FD.

DESCRIPTION OF THE PREFERRED EMBODIMENT(S)

With reference to the drawings, each embodiment of the present invention will be described below.

First Embodiment

Figure 1:
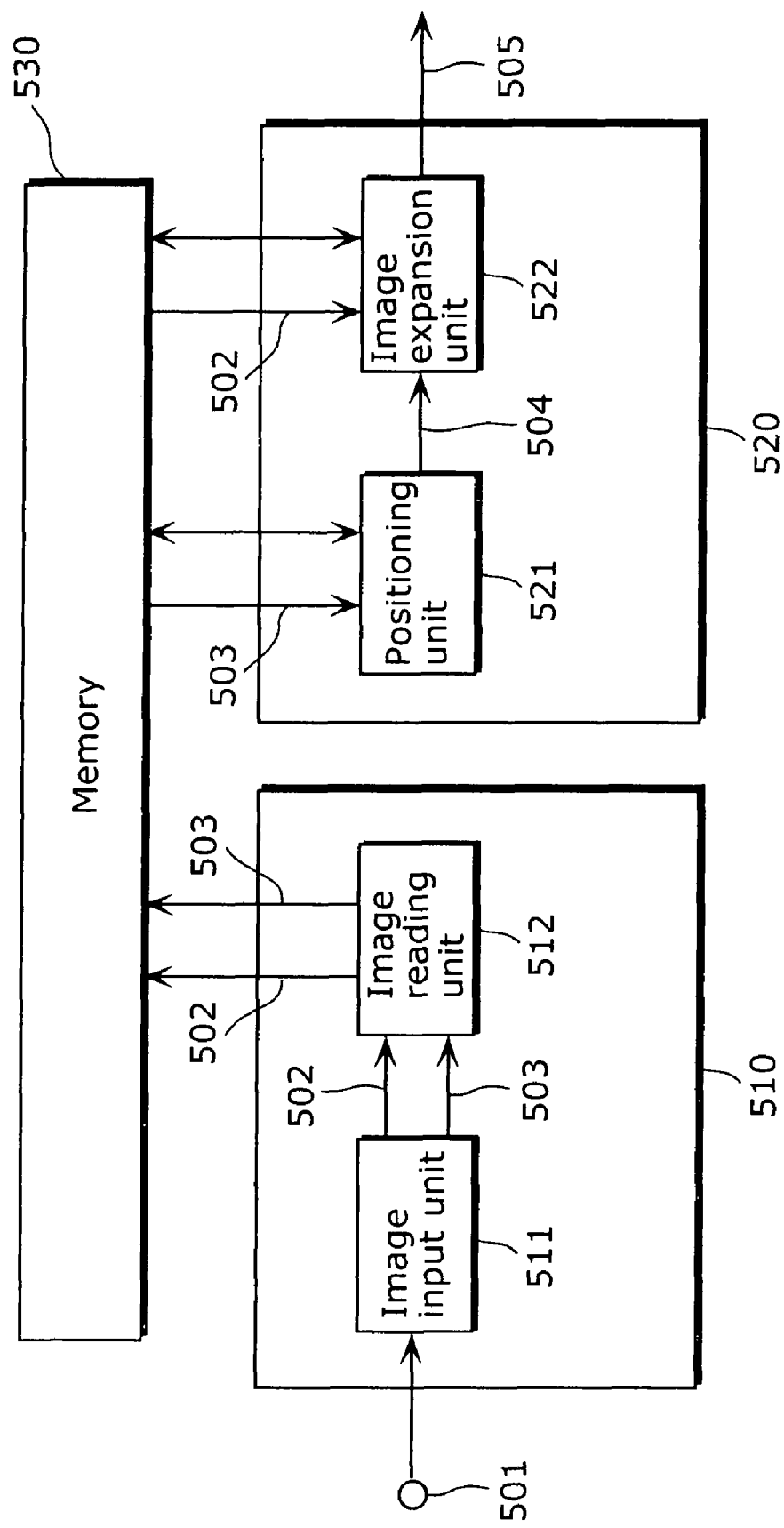
FIG. 1 is a block diagram showing the configuration of a conventional image expansion device.
Figure 2:
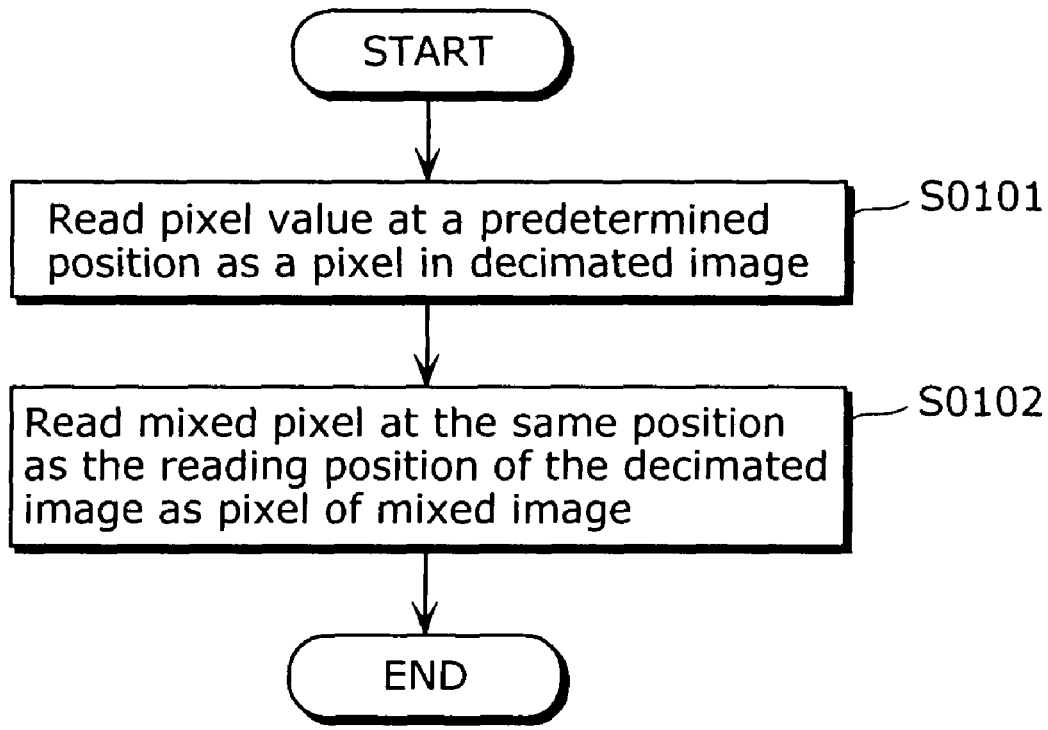
FIG. 2 is a flowchart showing the operation of an image storage unit of the conventional image expansion device.
Figure 3A:
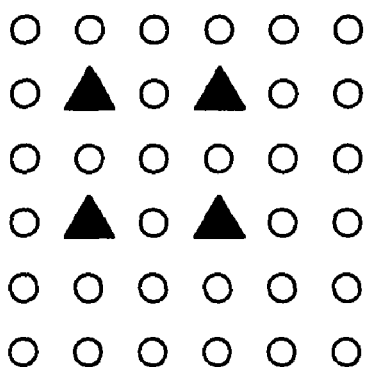
FIGS. 3A and 3B are diagrams for describing a decimated image and a mixed image.
Figure 3B:
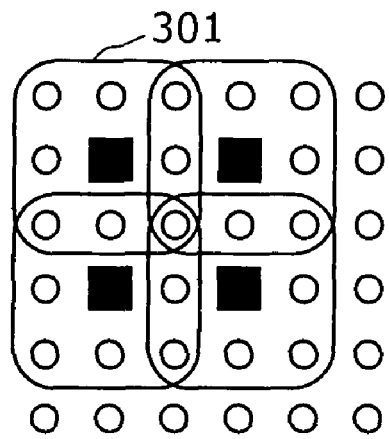
Figure 4:
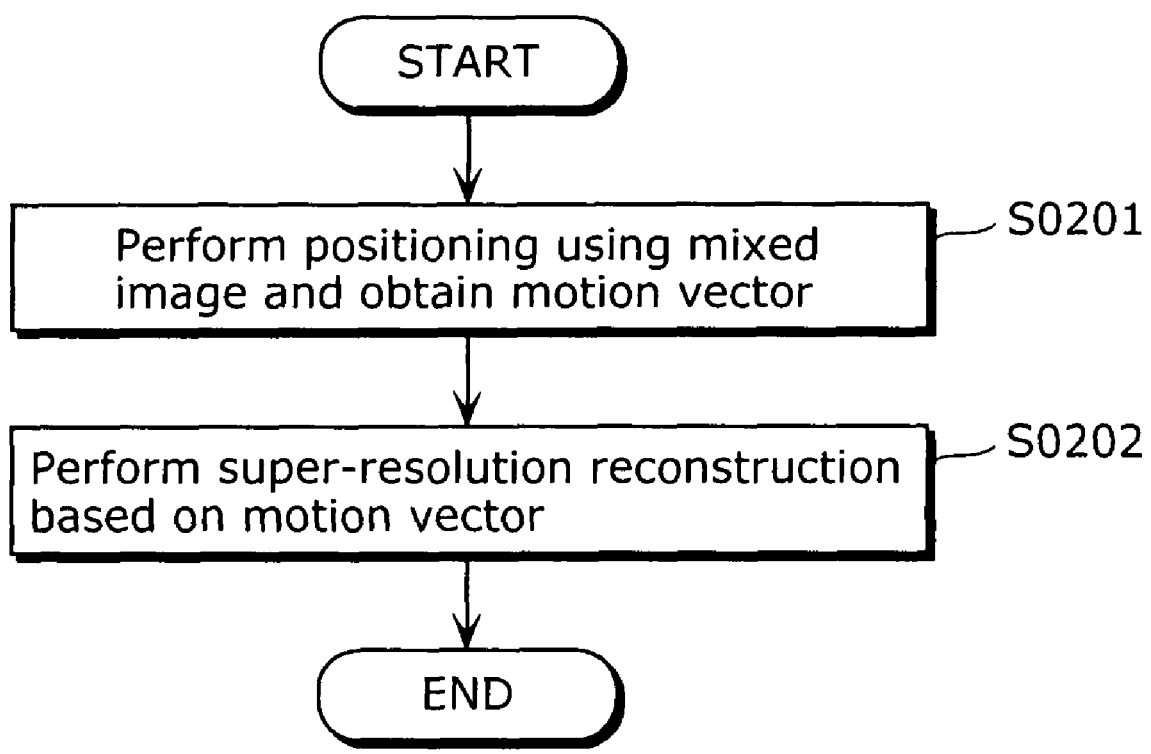
FIG. 4 is a flowchart showing the operation of an image reproducing unit of the conventional image expansion device.
Figure 6:
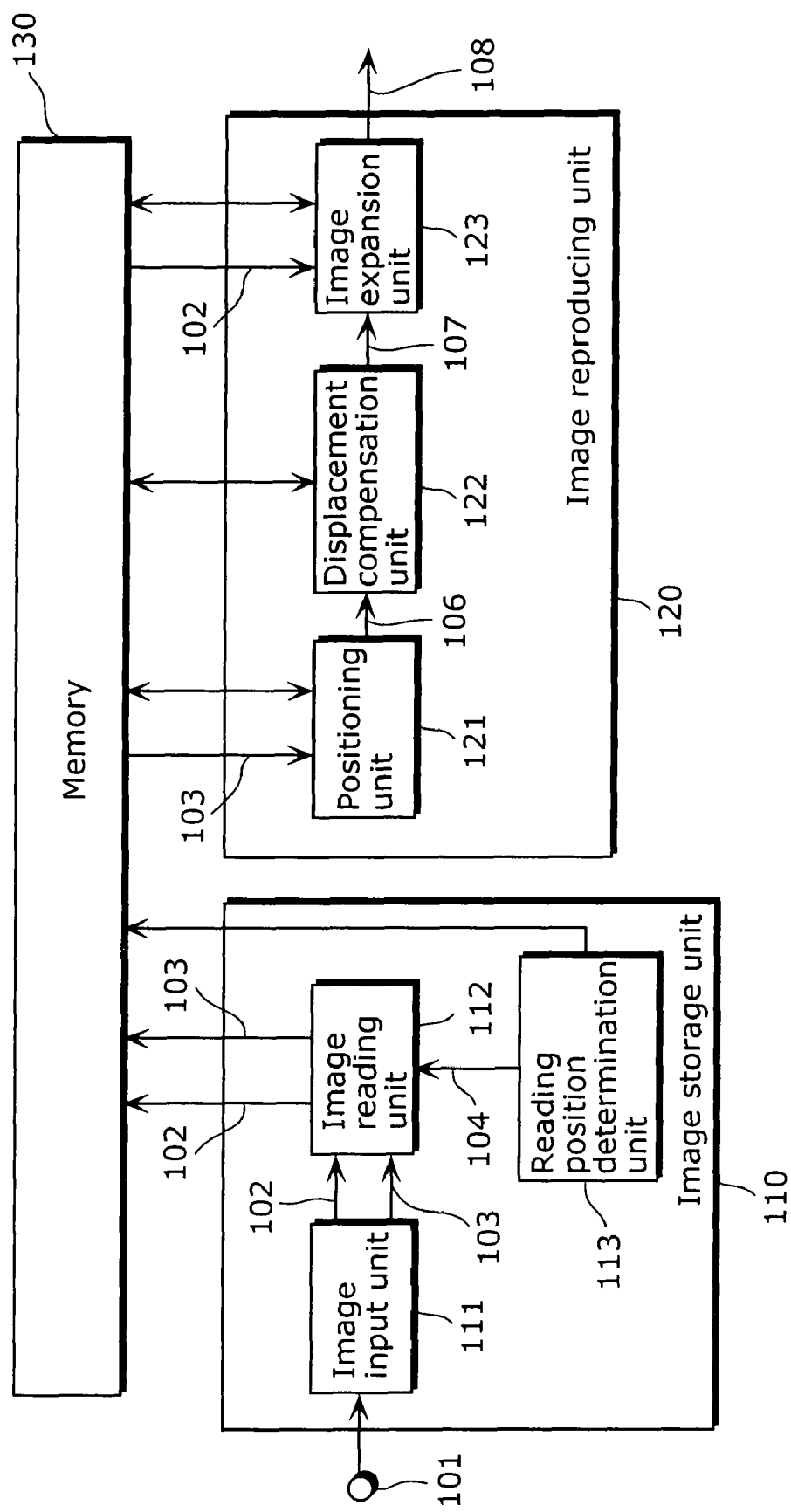
FIG. 6 is a block diagram showing the configuration of an image expansion device of a first embodiment.

FIG. 6 is a block diagram showing the configuration of an image expansion device of a first embodiment of the present invention.

An image expansion device 100 is a device which increases the resolution of an image by using two types of low-resolution images, and outputs the resulting expanded image. The image expansion device 100 includes an image storage unit 110, an image reproducing unit 120, and a memory 130 as shown in FIG. 6.

Here, the image storage unit 110 is constituted by an imaging device such as Charge Coupled Devices (CCD) and Complementary Metal Oxide Semiconductor (CMOS), and has an image input unit 111, an image reading unit 112, and a reading position determination unit 113.

The image input unit 111 shoots an input image 101. The reading position determination unit 113 determines a position of the discrete point in a mixed image, and a decimation position in the decimated image, and outputs a shift vector which indicates the determined position, to an image reading unit 112. Here, the shift vector indicates the amount of movement from a predetermined reference position of the reading position. The image reading unit 112 reads from the image input unit 111 a mixed image 103 and a decimated image 102 at a position designated by the shift vector, which has been inputted by the reading position determination unit 113, from the input image 101 shot by the image input unit 111, and stores these images in the memory 130.

Meanwhile, the image reproducing unit 120 has a positioning unit 121, a displacement compensation unit 122, and an image expansion unit 123.

The positioning unit 121 reads a plurality of mixed images 103 from the memory 130, positions the plurality of read mixed images 103 to calculate each of an amount of displacement among the images, and outputs the amount of displacement to the image expansion unit 123. Note that here the amount of displacement is represented by a motion vector 106. The displacement compensation unit 122 compensates for the motion vector 106, which indicates the amount of displacement, based on the amount of movement of each reading position, and calculates the post-compensation motion vector 107. The image expansion unit 123 performs, based on the post-compensation motion vector 107, super-resolution reconstruction to expand the image using a plurality of decimated images 102, which are read from the memory 130, and outputs an expanded image 108.

Next, the operation of the image expansion device 100, which is constituted as described above, will be described.

First, the image storage unit 110 reads the input image 101 while changing the position of the discrete point in the mixed image, and the decimation position in the decimated image to generate displacement on the read mixed image and decimated image. Further, the image reproducing unit 120 uses the displacement generated at the time of reading to perform super-resolution. The operation of the image expansion device 100 will be described in details below.

Figure 7:
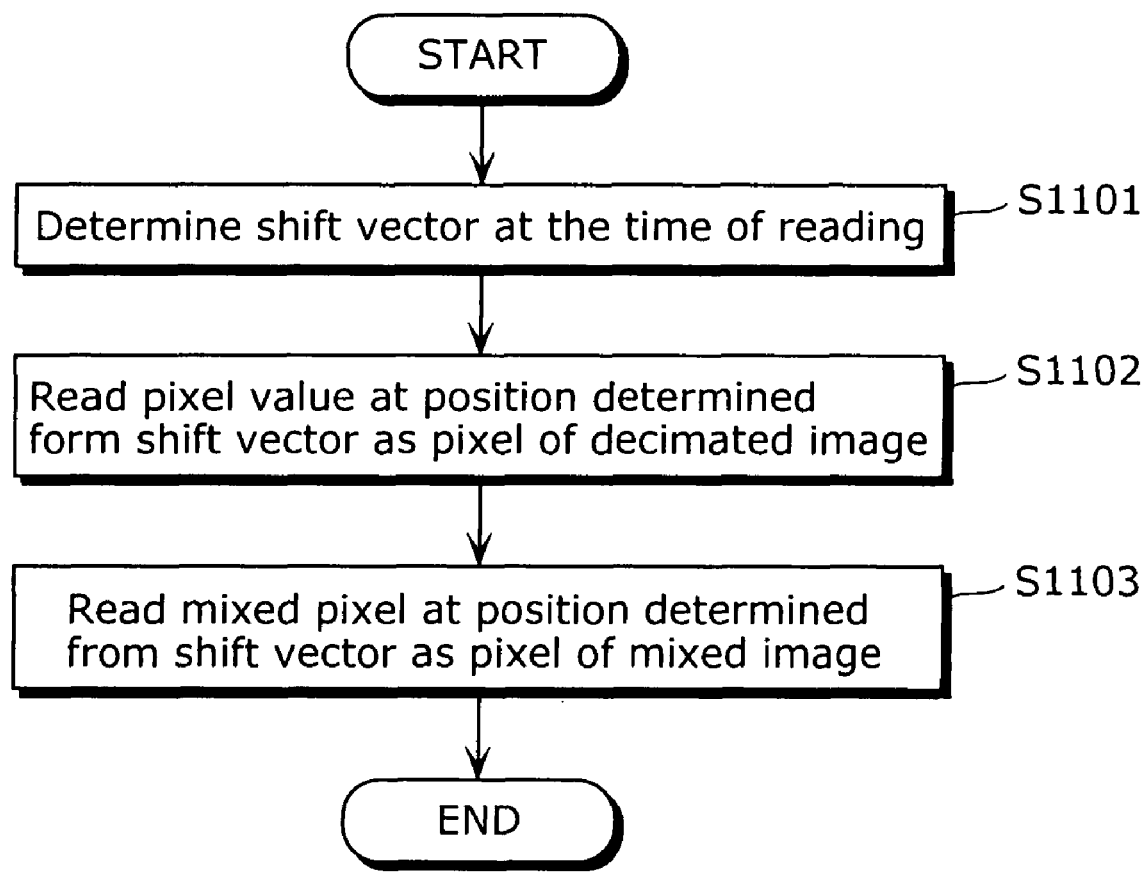
FIG. 7 is a flowchart showing the operation of an image storage unit of the first embodiment.

FIG. 7 is a flowchart showing the reading operation of each input image in the image storage unit 110.

First, the reading position determination unit 113 determines a shift vector, which is information for designating a position of a discrete point in a mixed image, and a decimation position in a decimated image (Step S1101). The shift vector indicates an amount of movement from a predetermined reference position, and is designated as (1,1) when reading is performed by displacing pixels one by one in positive horizontal and vertical directions with respect to the reference position, for example. Next, the image reading unit 112 reads a pixel value at the position determined by the shift vector as the pixel of the decimated image (Step S1102). Further, the image reading unit 112 reads the mixed pixel at the position determined by the shift vector as the pixel of the mixed image. Note that the decimated image may be read (Step S1102) after the mixed image is read (Step S1103).

Figure 8:
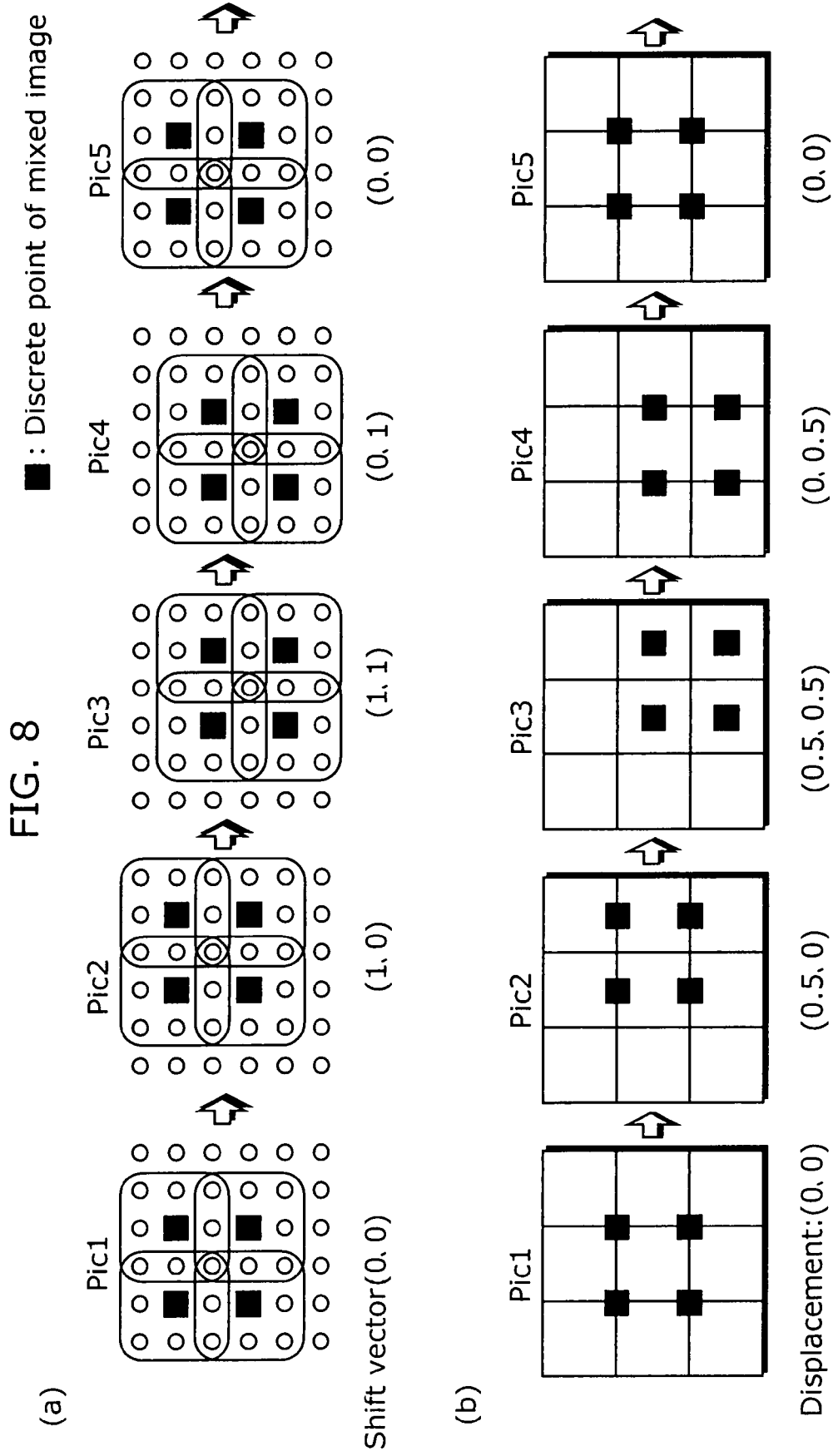
FIG. 8 is a diagram showing an example of reading an image in the image storage unit of the first embodiment, showing (a) an example where the reading is performed while a reading position is being moved along a shift vector, and (b) the pixel positions in the coordinate of the read mixed image.

FIG. 8 is a diagram showing an example whereby the mixed image is read while displacing the discrete point in each input image according to the shift vector. FIG. 8(a) is an example whereby the consecutive input images are read while the reading position is moved so as to change the shift vector in the $(0, 0) \rightarrow (1, 0) \rightarrow (1, 1) \rightarrow (0, 1)$ fashion, with the position where the shift vector is $(0, 0)$ being the reference position; black rectangles in the figure correspond to the discrete points in the mixed image. Note that only part of the pixels in the picture is shown in the figure, and other pixels are omitted. In the pictures from Pic1 to Pic4 in the figure, the positions of the discrete points are displaced by one pixel at a time, returning to the reference position on the picture Pic5. In this example, the mixed image is a low-resolution image, the resolution of which is ½ with respect to the input. FIG. 8(b) is a diagram showing the positions of the pixels in a coordinate of the low-resolution image of the mixed image corresponding to the pictures from Pic1 to Pic5. Each grid in FIG. 8(b) represents the position of the discrete point at the pixel position on the low-resolution image. The amount of movement of one pixel in FIG. 8(a) corresponds to the amount of movement of a half pixel on the low-resolution image. Accordingly, the pictures from Pic2 to Pic4 have the amount of movement of (0.5, 0), (0.5, 0.5), (0, 0.5), respectively, with respect to the picture Pic1, which is the reference position, on the low-resolution image. Note that (s, t) indicates the displacement of s pixels in the horizontal direction, and t pixels in the vertical direction.

Next, a method for setting the shift vector in the reading position determination unit 113 will be described. In super-resolution, it is preferable that a plurality of low-resolution images have displacement by a fractional pixel from one another. Accordingly, the shift vector is set so that the displacement by a fractional pixel is generated on the mixed image and the decimated image. For example, in the example of FIG. 8, the shift vector is set so that displacement by a half-pixel is generated. In addition, although the shift vector is set to circulate, the cycle of the circulation may be set according to an expansion ratio when super-resolution is performed on the read image. If there are N×N low-resolution images having displacement by a fractional pixel from one another where the expansion ratio is N, ideal super-resolution can be achieved. Accordingly, in the example shown in FIG. 8, in order to expand an image, which was read at ½ resolution, to the original size, 2×2=4 low-resolution images are enough. Therefore, as described above, for example, repeating the movement of the shift vectors: $(0, 0) \rightarrow (1, 0) \rightarrow (1, 1) \rightarrow (0, 1)$ is adequate.

Note that the expansion ratio N can be changed according to a frame rate, an image size, or the like. For example, when the image size is small, the expansion ratio N may be increased, on the other hand, when the image size is large, the expansion ratio N may be reduced. Further, for example, when the frame rate is low, the expansion ratio N may be increased, on the other hand, when the frame rate is high, the expansion ratio N may be reduced. Further, since distortion of the decimated image becomes large when the expansion ratio N becomes excessively large, the upper limit may be set on the expansion ratio N. Moreover, the upper limit of the expansion ratio N is determined according to which resolution among the resolutions of the imaging device was used to read the decimated image and the mixed image, that is to say, according to how much the resolution was lowered with respect to the input image to read out the low-resolution image.

Figure 9:
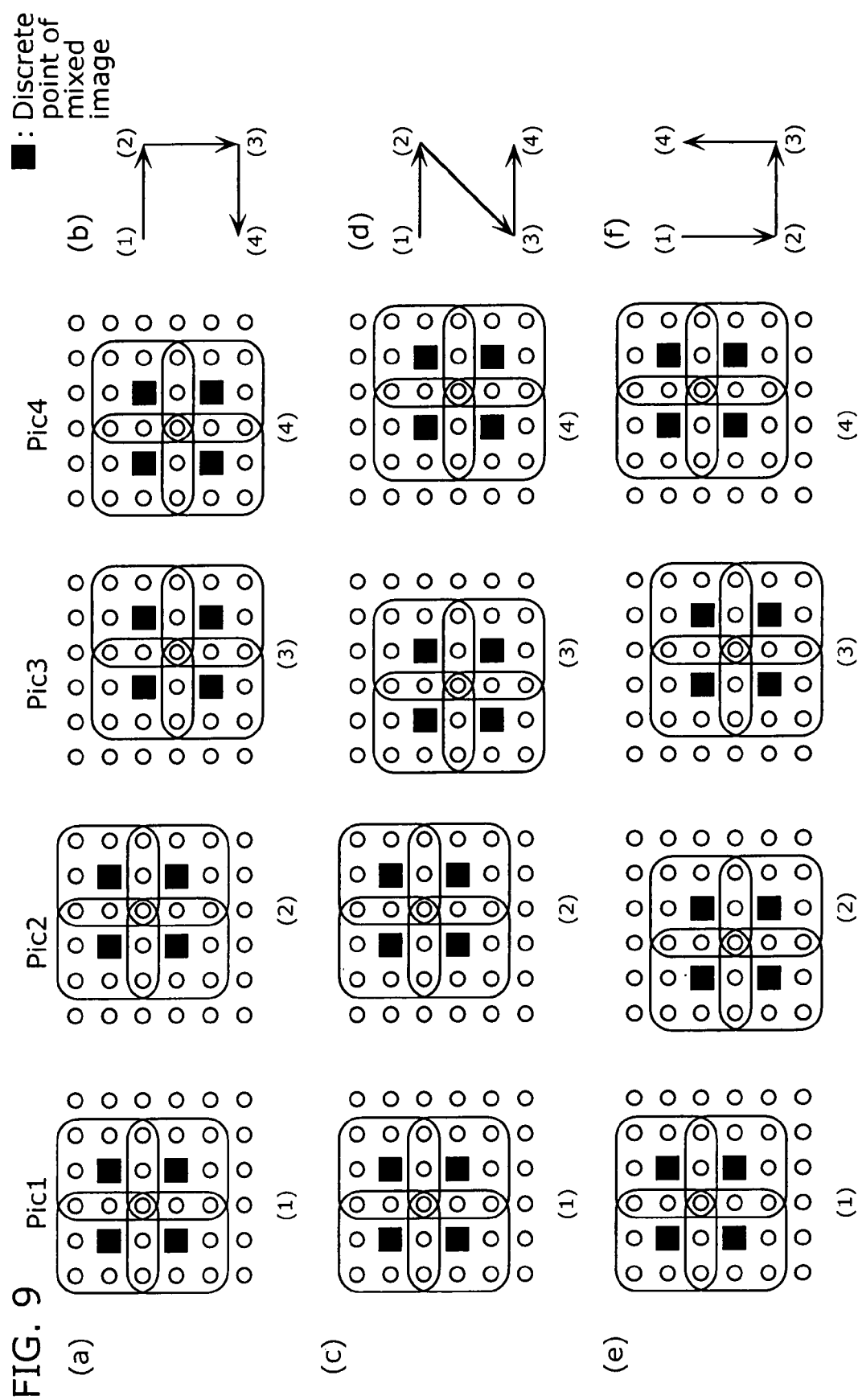
FIG. 9 is a diagram showing an example of a displacement method when the image in the image storage unit of the first embodiment is read, (a) an identical movement pattern to the example of FIG. 8, (b) a diagram resulting from the simplification of the movement pattern shown in (a), (c) an example of another movement pattern, (d) a diagram resulting from the simplification of the movement pattern shown in (c), (e) an example of another movement pattern, and (f) a diagram resulting from the simplification of the movement pattern shown in (e)

FIG. 9 is a diagram showing an example of the movement pattern of the reading position of the mixed image, (a) an identical movement pattern to the example in FIG. 8, (b) a diagram resulting from the simplification of the movement pattern shown in (a), (c) an example of another movement pattern, (d) a diagram resulting from the simplification of the movement pattern shown in (c), (e) an example of another movement pattern, and (f) a diagram resulting from the simplification of the movement pattern shown in (e). In FIGS. 9(a), (c), and (e), the movement of (1)→(2)→(3)→(4) is repeated, with the position of (1) in all the figures being the reference position. That is to say, in the example of FIG. 9(a), the consecutive input images as described above are read while the reading position is moved so as to change the shift vector in the (0, 0)→(1, 0)→(1, 1)→(0, 1) fashion, with the position where the shift vector is (0, 0) being the reference position. In addition, in the example of FIG. 9(c), the consecutive input images are read while the reading position is moved so as to change the shift vector in the (0, 0)→(1, 0)→(0, 1)→(1, 1) fashion, with the position where the shift vector is (0, 0) being the reference position. Further, in the example of FIG. 9(e), the consecutive input images are read while the reading position is moved so as to change the shift vector in the (0, 0)→(0, 1)→(1, 1)→(1, 0) fashion, with the position where the shift vector is (0, 0) being the reference position.

Figure 10:
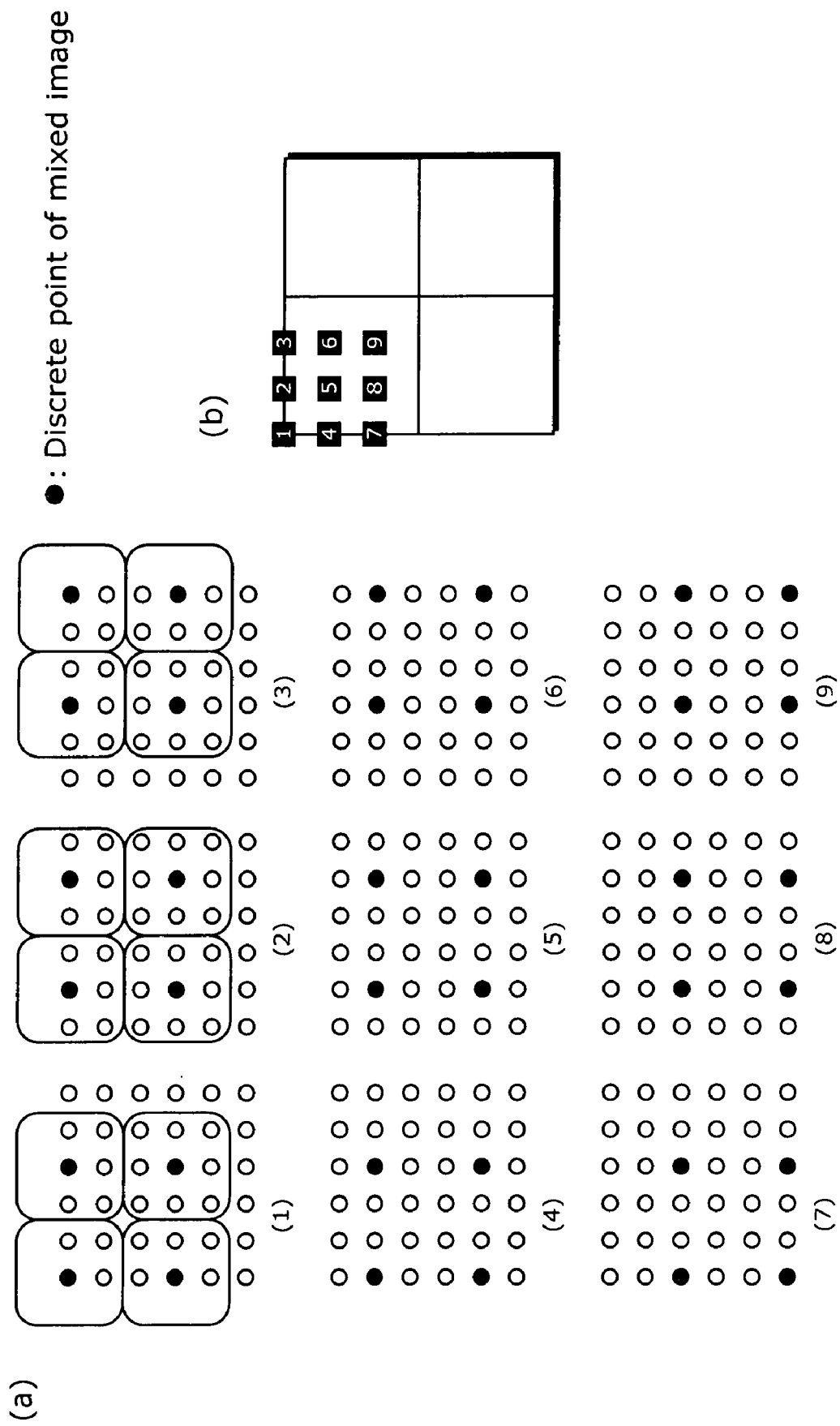
FIG. 10 is a diagram showing an example of image reading according to the reduction ratio of the read image in the image storage unit of the first embodiment, showing (a) an example of a movement pattern of the reading position of the mixed image, and (b) the pixel positions in the coordinate of the mixed image, which was read with the movement pattern of (a)

FIG. 10 is a diagram showing an example of image reading when the image, which was read at ⅓ resolution, is expanded to the original size, showing (a) an example of a movement pattern of the reading position of the mixed image, and (b) the pixel positions in the low-resolution image of the read image with the movement patterns from (1) to (9) in (a). In this case, since the expansion ratio is three times, an ideal super-resolution can be achieved with 3×3=9 low-resolution images; thus the generation of nine read images having displacement by a fractional pixel from one another is adequate. Therefore, for example, the reading position is moved so as to change the shift vector in the (1) (0, 0)→(2) (1, 0)→(3) (2, 0)→(4) (0, 1)→(5) (1, 1)→(6) (2, 1)→(7) (0, 2)→(8) (1, 2)→(9) (2, 2) fashion as shown in FIG. 10(a). When the reading position is moved in this manner, read images can be obtained, which are displaced by ⅓ pixels from one another as shown in FIG. 10(b).

Next, with reference to FIGS. 11 and 12, an example of reading the mixed image in the bayer arrangement, which is widely used in a common imaging device, will be described.

Figure 11A:
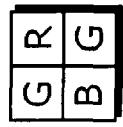
FIGS. 11A to 11C are diagrams showing an image reading method in a bayer arrangement.
Figure 11B:
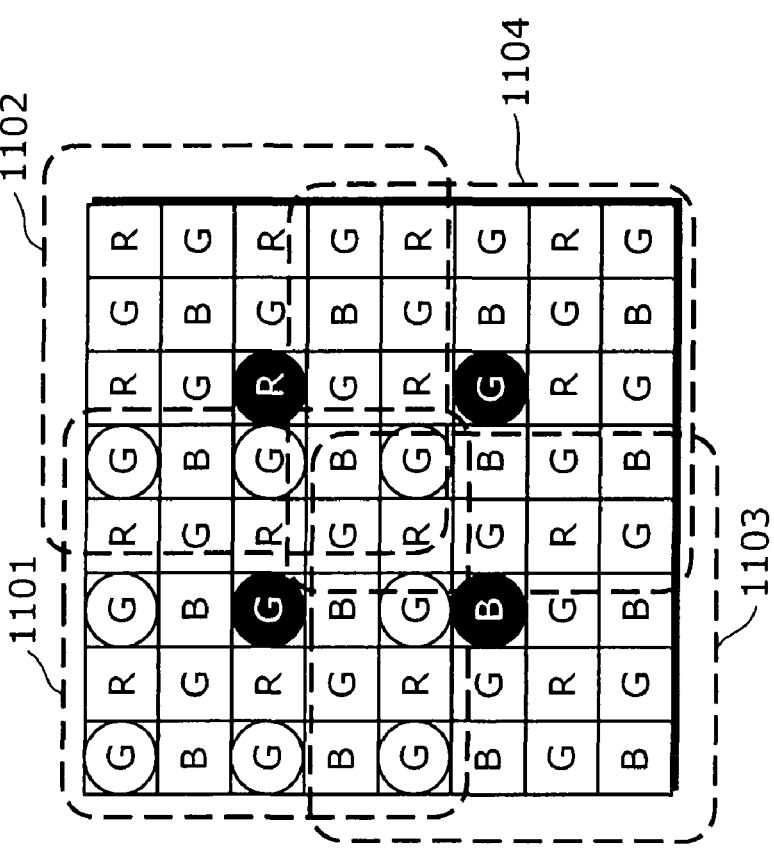
Figure 11C:
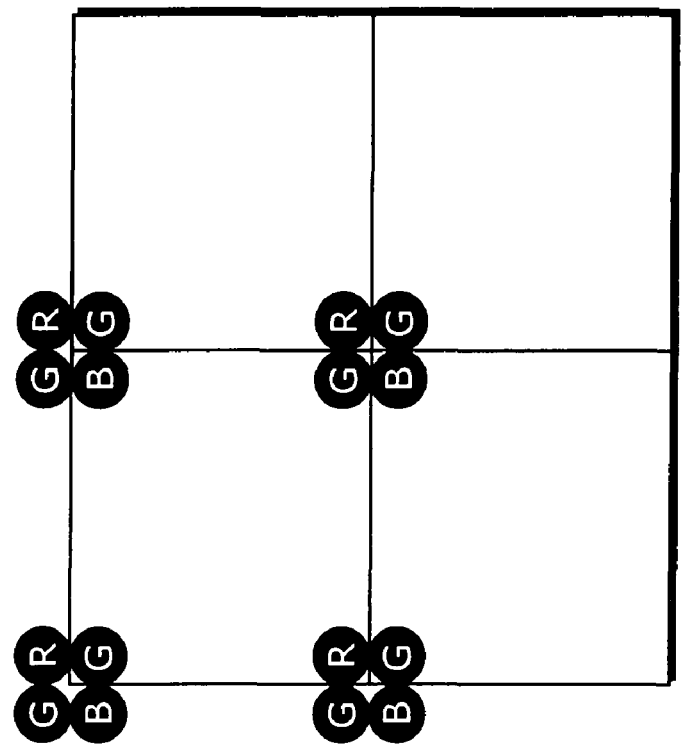

FIGS. 11A to 11C are diagrams for describing pixel mixture in a bayer arrangement. FIG. 11A shows the basic unit of the bayer arrangement. FIG. 11B shows an example of mixture of nine pixels in the bayer arrangement. FIG. 11C shows the pixel positions on the low-resolution image of the mixed pixels after the nine pixels are mixed. Rs, Gs, and Bs in the figure indicate red, green, and blue imaging devices, respectively, and black circles indicate the discrete points in the mixed image.

In the bayer arrangement, as shown in FIG. 11A, a unit in which one R pixel, one B pixel, and two G pixels are integrated is a basic unit. Thus, for example, as shown in FIG. 11B, nine G pixels in an area 1101 are mixed to serve as the pixel value of the discrete point of the G pixel, positioned at the center of the area 1101. Similarly, nine R pixels in an area 1102 are mixed to serve as the pixel value of the discrete point of the R pixel, positioned at the center of the area 1102. In addition, similarly, nine B pixels in an area 1103 are mixed to serve as the pixel value of the discrete point of the B pixel, positioned at the center of the area 1103. In addition, similarly, nine G pixels in an area 1104 are mixed to serve the pixel value of the discrete point of the G pixel, positioned at the center of the area 1104. By performing pixel mixture in this manner, the mixed pixels become the pixel positions on the low-resolution image as shown in FIG. 11C.

FIGS. 12A and 12B are diagrams showing an example whereby pixel mixture is performed while displacing the position of the discrete point in a bayer arrangement. FIG. 12A shows an example where the reading is performed while a reading position is being moved so that the shift vector changes (0, 0)→(1, 0). FIG. 12B shows the pixel positions on the low-resolution image after the pixels are mixed. The picture Pic1 in the figure corresponds to a reference position, that is to say, a position where a shift vector is (0, 0), and the picture Pic2 corresponds to a position where the sift vector is (1, 0). The minimum unit of the movement of the shift vector is the basic unit of the bayer arrangement shown in FIG. 11A. In an example of mixture shown in FIG. 12A, since the resolution is lowered to ⅓, the change of the shift vector (0, 0)→(1, 0) corresponds to a movement corresponding to ⅓ pixels in the horizontal direction on the low-resolution image as shown in FIG. 12B. Note that the pixel arrangement is not limited to a bayer arrangement, but it may be applied to other arrangements such as a honeycomb arrangement.

Note that although the movement pattern of the shift vector was determined above based on the expansion ratio when expanding the read image to the size of the input image, a fixed movement pattern may be used regardless of the expansion ratio. Further, the movement pattern of the shift vector may be determined according to the number of available reference images. For example, when four images can be used in total, the movement pattern is determined so that four images having displacement from one another can be obtained, such as (0, 0)→(1, 0)→(1, 1)→(0, 1).

Further, the movement pattern of the shift vector may be switched according to switching of the reading method for an input image. Here, switching of the reading method for an input image means such cases as when changing in how much the resolution is lowered with respect to the input image to read the low-resolution image during shooting.

The method for moving the reading position in the mixed image has been described above, and the similar method is used to move the reading position in the decimated image.

Note that when the amounts of movement from the reference position in the decimated image and the mixed image are matching, the reference positions themselves may be different. This is because the displacement among the mixed images and the displacement among the decimated images become equal when the amounts of movement from the reference position in the decimated image and the mixed image are matching.

In addition, the reading position determination unit 113 also stores in the memory 130 supplementary information for identifying the amounts of movement on each of mixed image and the decimated image when the images are read. Note that the reading position determination unit 113 may store information for identifying the mixed image and the decimated image at the reference position, information for indicating the movement pattern of the shift vector, and the minimum unit of the amount of movement. In this case, the amount of movement at the time of image reading, in the mixed image and the decimated image having a position different from the reference position, can be determined by the movement pattern of the shift vector. For example, in the example of FIG. 8, the picture Pic1 and the picture Pic5 serve as the reference positions, and the movement pattern of the shift vector is (0, 0)→(1, 0)→(1, 1)→(0, 1), with the minimum unit of the amount of movement being half a pixel. Accordingly, the amount of movement with respect to the reference position of the picture Pic3 is 1×0.5=0.5 pixel in the horizontal direction, and 1×0.5=0.5 pixel in the vertical direction. Alternatively, when it is assumed that the minimum unit of the amount of movement is one pixel on the input image side, the amount of movement in the read image may be calculated from the ratio of the resolution between the separately stored input image and the read image.

In addition, the image storage unit 110 may code the read mixed image and decimated image before storing them in the memory 130. In this case, the reading position determination unit 113 determines the shift vector so that a specific image such as an intra picture coding image may serve as a reference position, and information for identifying the image of the reference position may be omitted.

Further, in specific cases such as when an intra picture coding or a shooting is suspended and then resumed, the shift vector may be reset to the reference position.

Figure 13B:
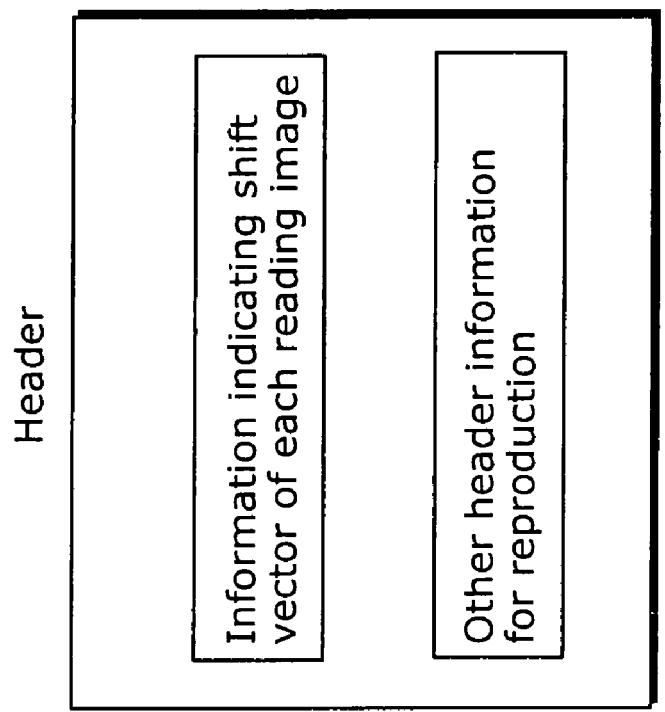
FIGS. 13A and 13B are diagrams showing an example of recorded data in the image storage unit of the first embodiment.
Figure 13A:
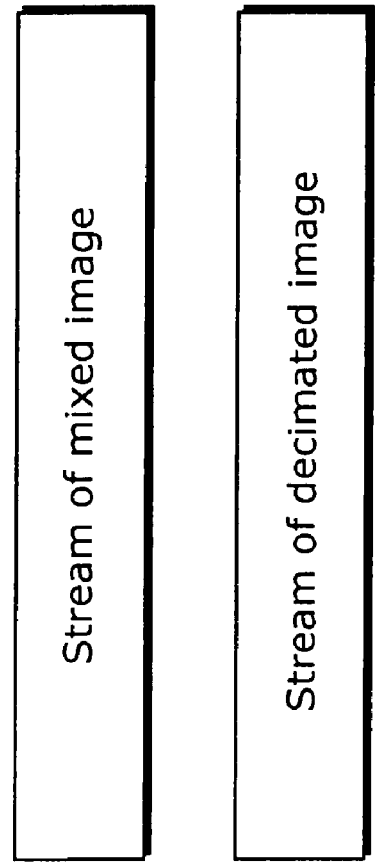

FIGS. 13A and 13B are diagrams showing an example of configuration of data, which is recorded on the memory 130 by the image storage unit 110. FIG. 13A shows the configuration of a stream. FIG. 13B shows the configuration of a header. First, as shown in FIG. 13A, the stream of the mixed image and the stream of the decimated image are recorded on the memory 130. Further, as shown in FIG. 13B, information for indicating the shift vector of each read image and information necessary to reproduce, which is the record destination addresses of the mixed image and the decimated image and the like, are stored as head information. Note that when the reference position is known, information for identifying the reference position may be omitted. In addition, for example in cases such as when the reference positions are different between the decimated image and the mixed image, information for identifying the reference positions of the mixed image and the decimated image may be further stored as header information. Moreover, data shown in FIGS. 13A and 13B may be kept on the memory, or recorded as a file. Particularly, when data recorded on the image storage unit 110 is reproduced after recording is completed, recording with a file is effective. Furthermore, at the time of recording, header information and stream data may be packetized before recording, or recorded separately.

Subsequently, the operation of the image reproducing unit 120 will be described.

FIG. 14 is a flowchart showing the operation of the image reproducing unit 120. First, the positioning unit 121 reads a plurality of mixed images 103 from the memory 130, performs positioning using the plurality of read mixed image, and obtains the motion vector 106 (Step S1201). Although the motion vector 106 is used to position the decimated image when super-resolution is performed, the amount of movement at the time of reading the decimated image is considered when the decimated image is positioned. This is because when the decimated image referred to is positioned with respect to the reading position of the decimated image to be expanded, displacement (corresponding to the amount of movement during reading) accompanying a movement is generated also among post-expansion images since the reading position of the decimated image is moved. Thus, a displacement compensation unit 122 compensates for the motion vector 106 based on the amount of movement of the reading position on each decimated image, and obtains the post-compensation motion vector 107 (Step S1202). Here, the motion vector 106 is compensated, with the position on the image where the shift vector is (0, 0) being the reference position. For example, as shown in FIG. 8(a), with respect to the motion vector 106 of the decimated image corresponding to the picture Pic2 with the shift vector (1, 0), a compensation of (0.5, 0) is performed when the expansion ratio is assumed to be twice. Similarly, a compensation of (0.5, 0.5) is performed with respect to the motion vector 106 of the decimated image with the shift vector (1, 1), and the compensation of (0, 0.5) is performed with respect to the motion vector 106 of the decimated image with the shift vector (0, 1). This matches the position of the referred decimated image with the position of the decimated image to be subjected to image expansion. Note that the reference position may be an image with a position giving a shift vector that is different from (0, 0). Subsequently, the image expansion unit 123 performs super-resolution reconstruction based on the post-compensation motion vector 107 to expand the image, and outputs the expanded image 108 (Step S1203).

Note that although, in the present embodiment, a configuration in which the displacement compensation unit 122 is provided between the positioning unit 121 and the image expansion unit 123, the amount of movement of the reading position is compensated after positioning, and the image is expanded is used, configuration is not limited thereto. For example, the amount of movement of the reading position may be compensated before positioning. In this case, the displacement compensation unit 122 inputs the amount of movement among the mixed images at the time of reading in the positioning unit 121, and inputs the amount of movement among the decimated images at the time of reading in the image expansion unit 123. Then, the positioning unit 121 compensates for the displacement of the amount of movement at the time of reading before positioning. Further, the image expansion unit 123 compensates for the amount of movement at the time of reading on the decimated image before the super-resolution reconstruction.

Furthermore, for example, the image may be expanded after positioning, and then the amount of movement of the reading position may be compensated. In this case, the image after expanded is moved based on the amount of movement of the reading position.

FIGS. 15A to 15C are diagrams depicting a case where the amount of movement of the reading position is compensated after image expansion. FIG. 15A shows the amount of movement of the reading positions of the pictures from Pic1 to Pic4 on the decimated image. FIG. 15B shows position relationship between pictures Pic1 and Pic3 after image expansion. FIG. 15C shows the picture Pic3 after the picture is moved to the reference position. When the picture Pic1 on the decimated image and the picture Pic3 on the decimated image are expanded twice in both the horizontal and vertical directions, the picture Pic3 is displaced by one pixel in both the horizontal and vertical directions in the positive direction with respect to the picture Pic1, in the coordinate of the high-resolution image after expansion, as shown in FIG. 15B.

Accordingly, when the expanded image of the picture Pic3 is reproduced, the pixels are displaced before reproduction by one pixel in both the horizontal and vertical directions in the negative direction to be positioned with the pixel position of the reference position Pic1, as shown in FIG. 15C. At that time, the pixels on the leftmost and uppermost of the image (region 1501 of FIG. 15B) are empty. When super-resolution is performed on the picture Pic3, the pixel values in the region 1501 are filled as a result of interpolation from the neighborhood pixels on the picture Pic3, or as a result of the positioning of the adjacent pictures. On the other hand, the pixels included in the region 1502 of FIG. 15B) become unnecessary.

As described above, since, in the image expansion device 100 of the present embodiment, the image storage unit 110 reads the mixed image and the decimated image while displacing the reading position, even if the input image is motionless, a mixed image sequence and a decimated image sequence having displacement by a fractional pixel from one another can be generated. Further, the image reproducing unit 120 uses displacement accompanying the amount of movement at the time of reading, which was generated by the image storage unit 110, to expand the image, and compensates the displacement of the expanded image resulting from the amount of movement at the time of reading. In this manner, even in a case where, in a conventional image expansion device, the image quality has been significantly lowered when an image is expanded because the input image is motionless, the image expansion device 100 can expand the input image to have a high image quality.

Second Embodiment

Next, an image expansion device 200 according to a second embodiment of the present invention will be described. In the image expansion device 200, whether or not the input image is motionless is judged, and only when the image is judged to be motionless, a mixed image and a decimated image are read while displacing the reading position.

Figure 16:
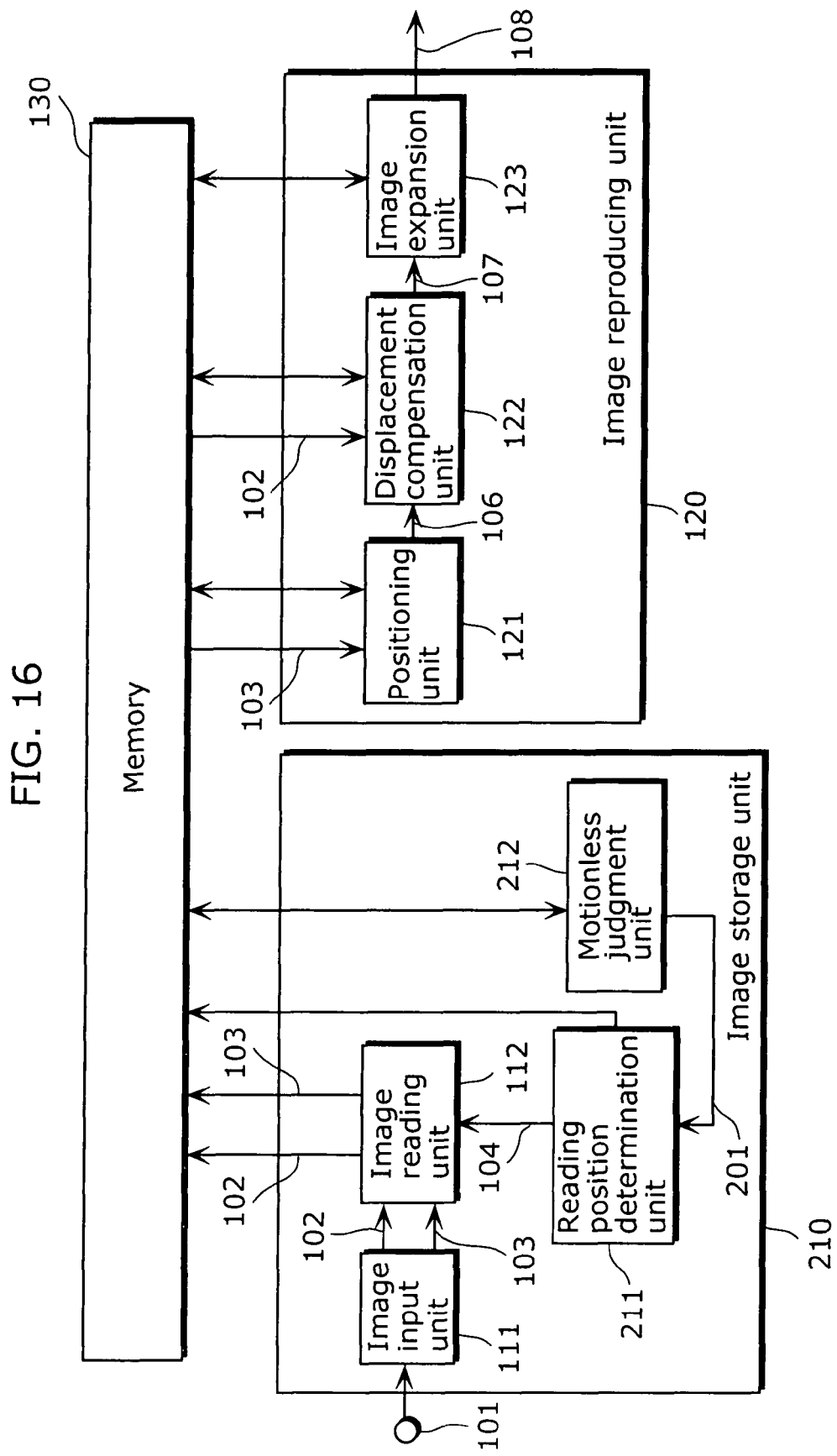
FIG. 16 is a block diagram showing the configuration of an image expansion device of a second embodiment.

FIG. 16 is a block diagram showing the configuration of the image expansion device 200 according to a second embodiment. Note that like numerals are used for like components to the components of the image expansion device 100 of the first embodiment, and description thereof is omitted.

Like the image expansion device 100 of the present first embodiment, the image expansion device 200 is a device which increases the resolution of an image by using two types of low-resolution images, and outputs the expanded image. The image expansion device 200 includes an image storage unit 210, an image reproducing unit 120, and a memory 130 as shown in FIG. 16. Compared with the image expansion device 100 of the present first embodiment, the configuration and the operation of the image storage unit 210 of the image expansion device 200 are different. The image storage unit 210 has a motionless judgment unit 212 in addition to the configuration of the image storage unit 110 of the image expansion device 100.

The motionless judgment unit 212 performs positioning among a predetermined number of mixed images that were read immediately before, judges whether or not the input image is motionless based on the result of the positioning, reads out the judgment result 201, and outputs the judgment result 201 to the reading position determination unit 211. The reading position determination unit 211 determines a shift vector to determine the reading positions on the mixed image and the decimated image based on the value of the judgment result 201. That is to say, the reading position determination unit 211 determines the reading position so that the reading positions of the mixed image and the decimated image move only when the input image is judged to be motionless.

Figure 17:
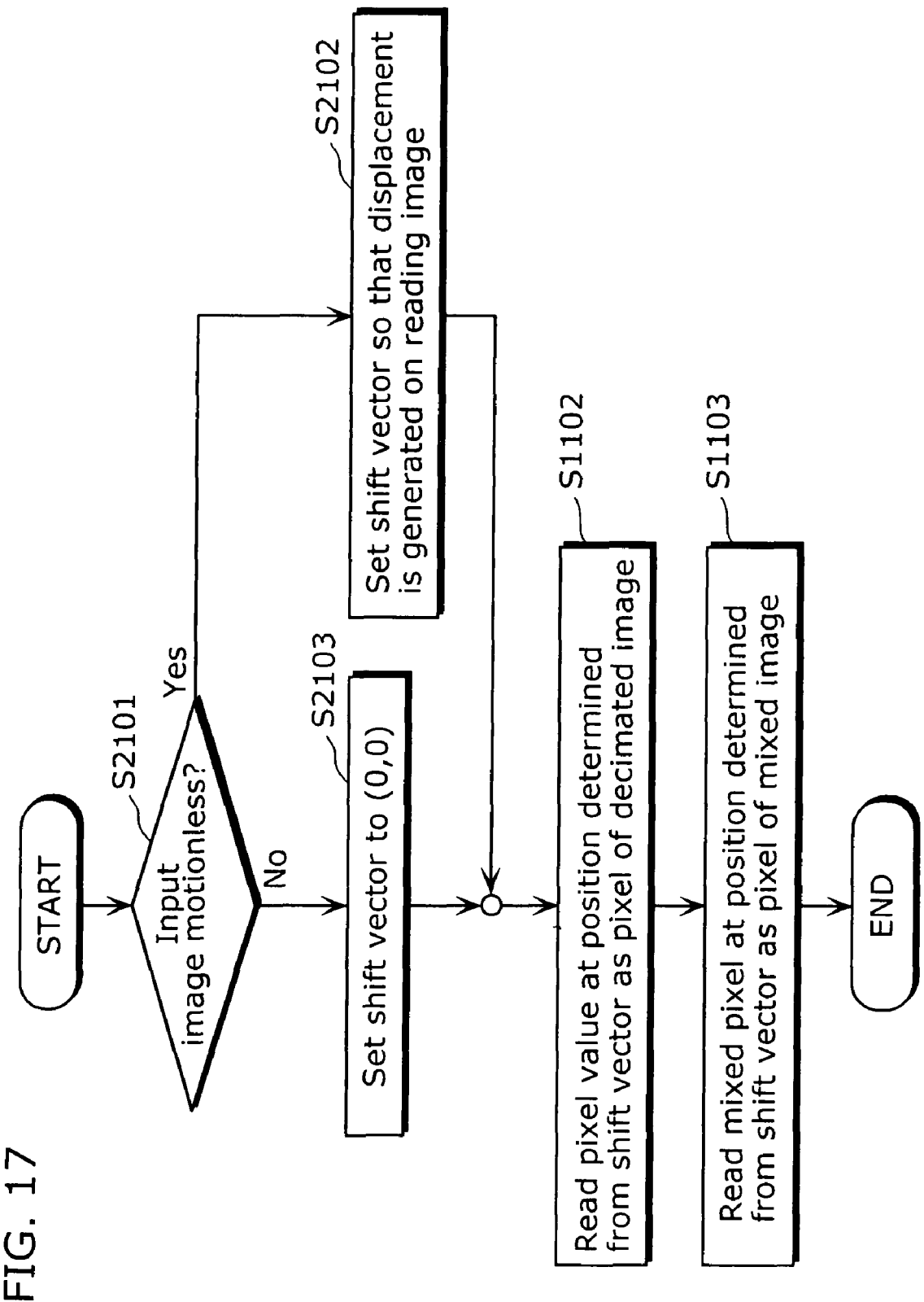
FIG. 17 is a flowchart showing the operation of an image storage unit of the second embodiment.

FIG. 17 is a flowchart showing the reading operation of each input image in the image storage unit 210. First, the motionless judgment unit 212 judges whether or not the input image is motionless (Step S2101). In the judgment, the motionless judgment unit 212 obtains from the memory 130 a predetermined number of mixed images that were read immediately before, and performs positioning among a predetermined number of mixed images. Then the motionless judgment unit 212 judges that the input image is motionless when the percentage of region where it is judged that the image has motion is equal to or less than a certain threshold. Note that the result of positioning at the time of image expansion may be used to judge whether or not the input image is motionless because the image reproducing unit 120 uses the mixed images to perform positioning at the time of image expansion. Alternatively, the input image may be judged to be motionless in a case where the image input unit 111 is motionless at the time of shooting, that is to say, in a case where a digital still camera or the like is fixed to shoot moving pictures. In this case, a gyro or the like, which is used for optical camera shake compensation or the like, is used to detect physical shakiness of the image input unit 111, and to judge that the image is motionless when the shakiness is equal to or less than the threshold. Although, with the present method, the accuracy of judgment may be lowered in a case where the input image is judged to be motionless even if a moving object is included in the image, this method may be used for simple judgment.

As a result of judgment by the motionless judgment unit 212, when the image is judged to be motionless (Yes in Step S2101), the reading position determination unit 211 sets the shift vector so that the reading positions of the mixed image and decimated image move (Step S2102). The method for setting the shift vector follows the method described in the above first embodiment. On the other hand, as a result of the judgment by the motionless judgment unit 212, when the image is judged not to be motionless (No in Step S2101), the reading position determination unit 211 sets the shift vector to the reference position (0, 0), and judges that the read image at the reference position is obtained (Step S2103). Subsequently, the image reading unit 112 reads the decimated image based on the shift vector determined by the reading position determination unit 211 (Step S1102), and reads the mixed image in the same manner (Step S1103).

Note that although the reading position determination unit 211 sets the shift vector to the reference position (0, 0), and judges that the read position at the reference position is obtained in the above processing (Step S2103), the present invention is not limited thereto, and the reading position determination unit may set the shift vector to another position different from the reference position, and judge that the input image is read from this position.

Further, the motionless judgment unit 212 may store separately in the memory 130 information indicating the section where the input images were judged to be motionless. Furthermore, in the section where the input image are shown to be motionless, the image reproducing unit 120 may perform positioning based solely on the displacement when the input image was read to expand the decimated image without performing positioning with the mixed image in the positioning unit 121.

As described above, in the image storage unit 210 of the present second embodiment, it is judged whether or not the input image is motionless, and when the image is judged to be motionless, the mixed image and the decimated image are read while displacing the reading position, therefore, an effect that compensation for the reading position is unnecessary when an image is reproduced, for which no reading position is changed is obtained.

Third Embodiment

Next, an image expansion device 300 according to a third embodiment of the present invention will be described. The image expansion device 300 selects whether or not the read image is reproduced with a high image quality, and, when the image is reproduced with a high image quality, expands the image by super-resolution, on the other hand, when the image is reproduced at a normal quality, expands the image by filtering before outputting.

Figure 18:
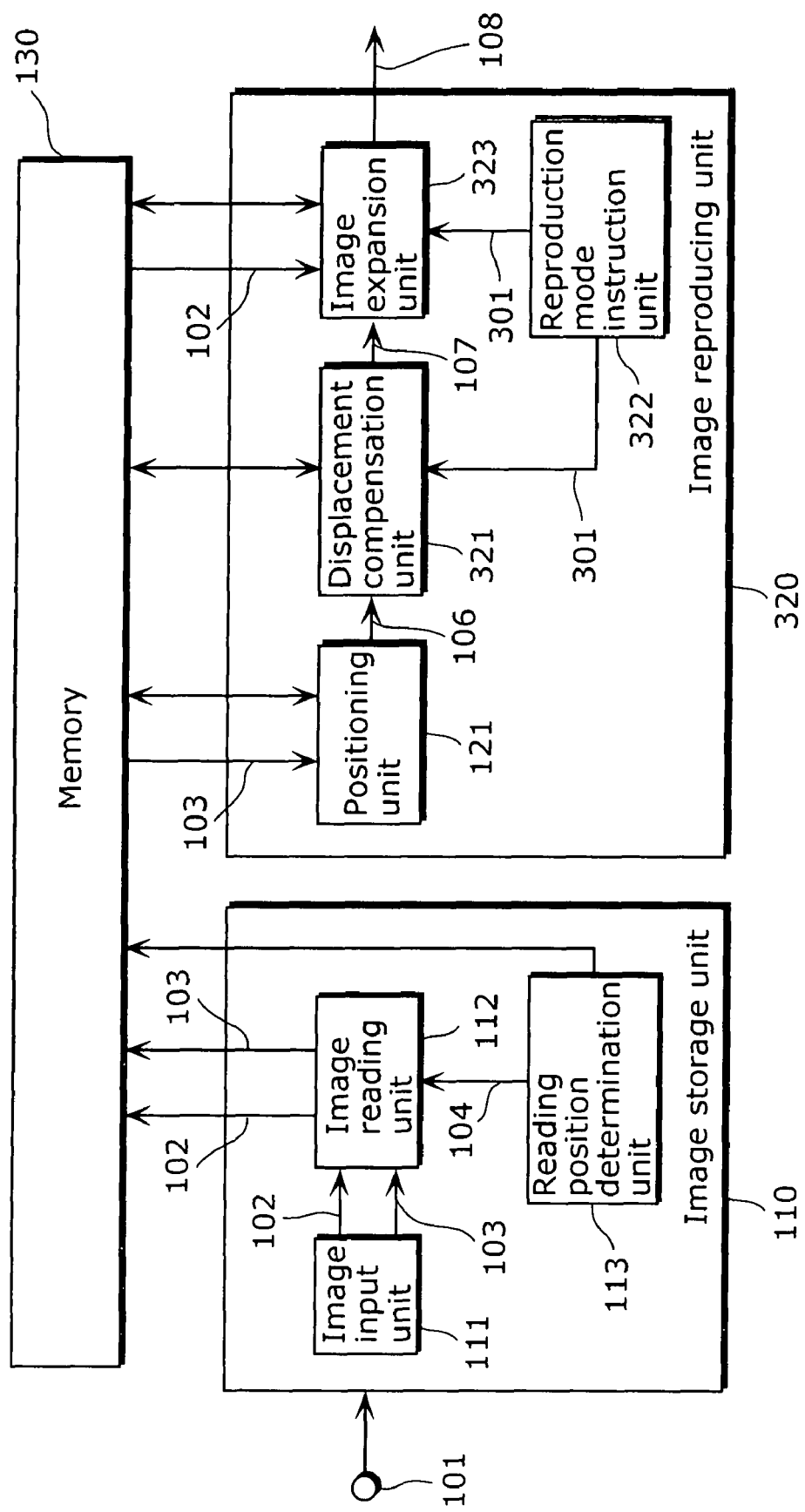
FIG. 18 is a block diagram showing the configuration of an image expansion device of a third embodiment.

FIG. 18 is a block diagram showing the configuration of an image expansion device 300 according to a third embodiment. Note that like numerals are used for like components to the components of the image expansion device 100 of the first embodiment, and description thereof is omitted.

Like the image expansion device 100 of the present first embodiment, the image expansion device 300 is a device which increases the resolution of an image by using two types of low-resolution images, and outputs the expanded image. The image expansion device 300 has an image storage unit 110, an image reproducing unit 320, and a memory 130 as shown in FIG. 18. Compared with the image expansion device 100 of the present first embodiment, the configuration and the operation of the image reproducing unit 320 of the image expansion device 300 are different. The image reproducing unit 320 has a reproduction mode instruction unit 322 in addition to the configuration of the image reproducing unit 120 of the image expansion device 100.

The reproduction mode instruction unit 322 outputs reproduction quality instruction signal 301, which indicates whether or not the image is reproduced with a high image quality at the time of reproduction, to a displacement compensation unit 321 and an image expansion unit 323. The image expansion unit 323 expands and outputs the mixed image or the decimated image according to the reproduction mode designated by the reproduction quality instruction signal 301. That is to say, the image expansion unit 323 uses a plurality of decimated images 102 obtained from the memory 130 to perform super-resolution reconstruction, and expands the image, based on the post-compensation motion vector 107, when the image is reproduced with a high image quality. In addition, the image expansion unit 323 expands the post-compensation mixed image, which was inputted from the displacement compensation unit 321, by filtering when the image is not reproduced in a high image quality mode.

Note that the image expansion unit 323 and the displacement compensation unit 321 may operate as follows. The image expansion unit 323 performs reconstruction and super-resolution of a plurality of decimated images 102, which are read from the memory 130 to output the expanded image 108, following the reproduction mode designated by the reproduction quality instruction signal 301, and based on the post-compensation motion vector 107 obtained from the displacement compensation unit 321 when the image is reproduced in a high image quality mode. When the image is not reproduced in a high image quality mode, the displacement compensation unit 321 outputs the amount of movement of the reading position as the post-compensation motion vector 107 to the image expansion unit 323. The image expansion unit 323 reads the mixed image 103 of a picture to be expanded from the memory 130, compensates for the displacement based on the amount of movement of the reading position obtained from the displacement compensation unit 321, performs interpolation-expansion by filtering, and outputs the expanded image 108.

FIG. 19 is a flowchart showing the operation of the image reproducing unit 320. First, the reproduction mode instruction unit 322 judges whether or not the image is reproduced in a high image quality mode (Step S2201). Here, whether or not the image is reproduced in a high image quality mode is designated by a user in advance. Note that equipment may set it automatically, based on the operation performance of the image reproducing unit 320. As a result of the judgment by the reproduction mode instruction unit 322, when the image is judged to be reproduced in a high image quality mode (Yes in Step S2201), the image expansion unit 321 expands the image by super-resolution, and outputs the image (Step S2202). On the other hand, as a result of the judgment by the reproduction mode instruction unit 322, when the image is judged not to be reproduced in a high image quality mode (No in Step S2201), the displacement compensation unit 321 compensates for the amount of movement when the mixed image is read, and outputs the post-compensation mixed image to the image expansion unit (Step S2203). Next, the image expansion unit 321 expands the post-compensation mixed image by filtering such as a bicubic method and a nearest neighbor method (Step S2204). Note that expansion processing in the image expansion unit 321 (Step S2204) is not limited to processing by a filter, and may be other methods with a lower amount of operations compared with super-resolution, or a plurality of filtering processes may be combined, for example, subjecting an image expanded by a bicubic method to an enhancement filter. In addition, although the reason for a mixed image being the target of image expansion is the lower effect of aliasing compared with the decimated image, and the mixed image is suitable for expansion by filtering, the decimated image may be expanded. Furthermore, compensation of the amount of movement at the time of mixed image reading may be performed, instead of prior to image expansion in the image expansion unit 321, after image expansion, on the expanded image.

As described above, since the image reproducing unit 320 of the present embodiment can select the image quality at the time of image expansion, an effect can be obtained that an expansion result by super-resolution may be outputted when a high-quality expanded image is needed, and an expanded image by filtering, in which an operational load is low, may be outputted in other cases; thus switching effectively between the output of a high image quality expanded image and the output of an expanded image with a low operational load becomes possible. For example, such usage as, expanding by super-resolution with a high image quality a specific image selected by a user, and at the time of reproduction of normal moving pictures, performing image expansion by filtering with a low amount of operations, is possible.

Variations from first embodiment to third embodiment will be described below.

First, in each embodiment, the image storage unit and the image reproducing unit may be performed separately. In this case, the image storage unit records the mixed image, the decimated image, and header information as files as shown in FIGS. 13A and 13B, and the image reproducing unit may read and reproduce the recorded files.

Further, the image expansion device of the present embodiment may be applied to image coding. When the input image shot by the image input unit is coded, the mixed image and the decimated image are read at lower resolution than that of the input image, and the read mixed image and decimated image are coded, respectively. In this case, information such as the amount of movement of the reading position may be included in coded data. At the time of decoding, the mixed image and the decimated image are first decoded, and the positioning result of the mixed image is used to super-resolve and output the decimated image. For example, when the resolution of the input image is lowered to ½ in both the horizontal and vertical directions for reading, the area of the image is lowered to ¼. Accordingly, the total area of the mixed image and the decimated image is ½ in total, and when these images are coded, data can be compressed efficiently compared with a case where the input image being coded at the original resolution. Further, when information on movement is shared between the mixed image and the decimated image at the time of inter picture prediction coding, further increase in the compression ratio is expected. Furthermore, the mixed image and the decimated image may be coded as one coded stream. Note that flag information indicating that the mixed image and the decimated image are used together at the time of decoding or indicating that the mixed image and the decimated image are included in the same stream may be included in coded data. In addition, flag information indicating that the decoded image is super-resolved and outputted may also be included in the coded data.

In addition, when it is known that the input image is motionless, the image storage unit may read only the decimated image while displacing the reading position. In this case, the image reproducing unit performs positioning based on the amount of movement of the reading position, and expands the decimated image.

Although a plurality of images have been positioned for super-resolution in each embodiment, a plurality of moving pictures may be positioned and synthesized to improve a signal to noise ratio of the moving picture including a lot of noise (in other words, improve sensitivity). This is because noise, which exists randomly, is not amplified even if a plurality of images are synthesized, but an original signal can be amplified by synthesizing a plurality of images. In this manner, the positioning unit used for super-resolution may be used for other purposes such as sensitivity improvement.

Fourth Embodiment

Further, a program for achieving an image expansion method shown in each of the above embodiments may be recorded on a recording medium such as a flexible disk or the like to carry out processing shown in each of the above embodiments easily on a stand-alone computer system.

Figure 20A:
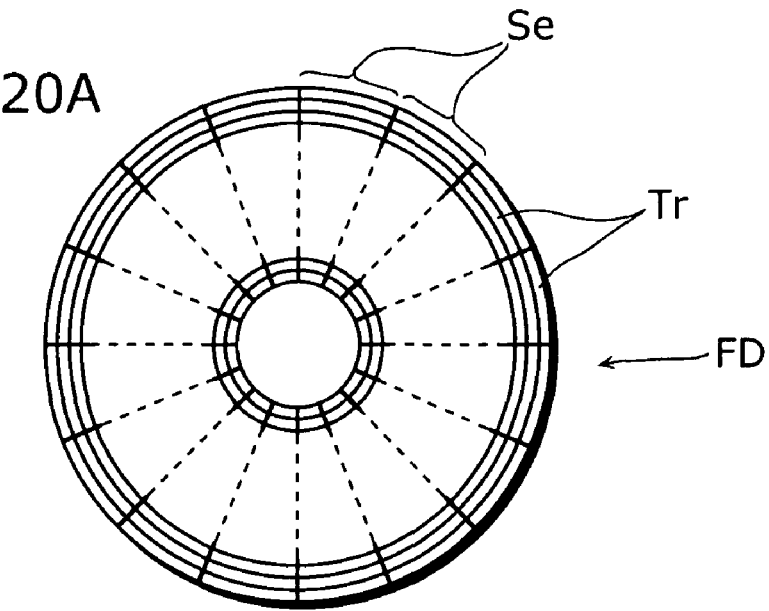
FIGS. 20A to 20C are explanatory diagrams about a storage medium for storing a program for achieving an image processing method for each embodiment with a computer system.
Figure 20B:
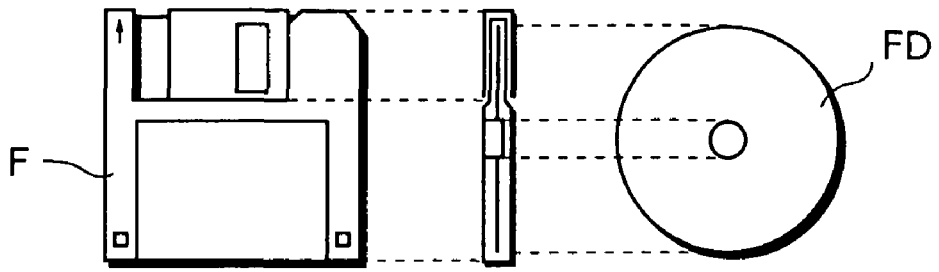

FIGS. 20A and 20B are explanatory diagrams of a case where the image expansion method of each of the above embodiments is performed by a computer system using a program recorded on a recording medium such as a flexible disk.

FIG. 20B shows the appearance of the flexible disk viewed from a front side, its cross-sectional configuration, and the flexible disk, and FIG. 20A shows an example of a physical format of a flexible disk, which is a storage medium body. The flexible disk FD is embedded in a case F, a plurality of tracks Tr are concentrically formed on the surface of the disk from the outer region to the inner region, and each track is divided into 16 sectors Se in an angular direction. Accordingly, on the flexible disk in which the above program is stored, the program is recorded on a region assigned to the flexible disk FD.

Figure 20C:
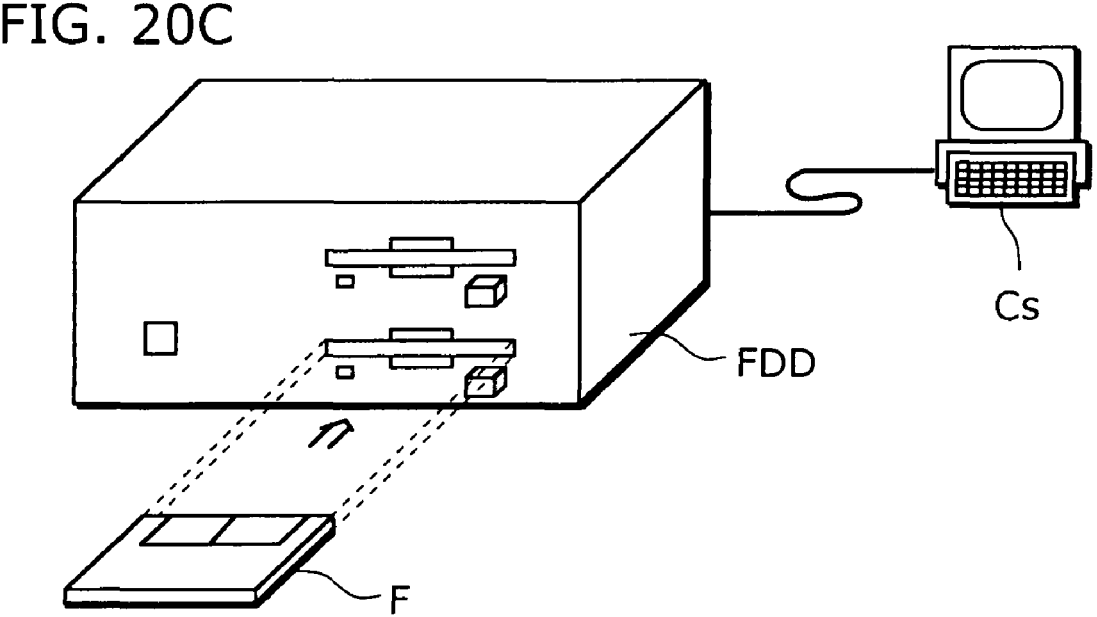

Further, FIG. 20C shows the configuration for recording and reproducing the above program on the flexible disk FD. When the program to achieve the image expansion method is recorded on the flexible disk FD, the program is written through the flexible disk drive from a computer system Cs. In addition, when the image expansion method to achieve the image expansion method by the program in the flexible disk is built in the computer system, the program is read from the flexible disk by the flexible disk drive and transferred to the computer system.

Note that although a flexible disk has been used as a recording medium for explanation in the above description, an optical disk may also be used for recording similarly. In addition, a recording medium is not limited thereto as long as it can record a program, and an IC card, a ROM cassette, or the like, may also perform recording similarly.

Although the image expansion device and the image expansion method according to the present invention has been described based on each of the above embodiments, the present invention is not limited to these embodiments. Those variations made to the present invention devised by those skilled in the art without departing from the spirit of the present invention are also included in the present invention.

For example, needless to say, an optical disk recording device, a moving picture transmission device, a digital television broadcast delivery device, a Web server, a communication device, a mobile information terminal, or the like, which are provided with an image expansion device according to the present embodiments, a moving picture receiving device, a moving picture recording device, a digital television broadcast receiving device, a communication device, a mobile information terminal, or the like, which are provided with an image expansion device according to the present embodiments, are also included in the present invention. Here, the moving picture recording device includes a camcorder, a Web camera, and a digital still camera, which has a moving picture shooting function or a continuous shooting function.

Note that each function block in block diagrams (FIGS. 6, 16, and 18) is typically achieved as a large scale integration (LSI), which is an integrated circuit. Each of them may be separately made of one chip, or part or all of them may be included in one chip. For example, function blocks other than memory may be made of one chip.

Here, although LSI has been used, it may be called an integrated circuit (IC), a system LSI, a super LSI and an ultra LSI depending on the difference of the degree of integration.

In addition, the technique of integrated circuit implementation is not limited to LSI, and a dedicated circuit or a general-purpose processor may be used for achievement. An Field Programmable Gate Array (FPGA) which can be programmed after LSI is produced, and a reconfigurable processor in which the connection and setting of the circuit cell in the LSI can be reconfigured may be used.

Moreover, when a technology of integrated circuit implementation replacing the LSI appears due to advancement of or another technology derived from semiconductor technology, the technology may be used, of course, to integrate function blocks. Biotechnology may be possibly applied.

In addition, among each function block, the unit for storing the data to be image processed may be a separate constitution, without integrating in a single chip.

According to the present invention, a low-load method that the mixed image and the decimated image are obtained while displacing the reading position on the image from the imaging device is used to achieve a high image quality image expansion even if a subject is motionless, and the present invention has a highly practical use, in particular, in equipment in which reading speed of the image data in an imaging device such as a digital still camera is limited.

What is claimed is:

1. An image reading method of reading a mixed image and a decimated image from each input image among a plurality of input images which are captured, said image reading method comprising:

determining, by a reading position determination unit, a reading position of a reading pixel of the mixed image and the decimated image for each of the plurality of input images, so that the reading position moves an amount which is different for each of the plurality of input images;

reading, by an image reading unit, the mixed image from each of the plurality of input images at the determined reading position, by mixing signals of adjacent pixels; and reading, by the image reading unit, the decimated image from each of the plurality of input images at the determined reading position, by selecting signals of spatially-separated pixels.

2. The image reading method according to claim 1, wherein the reading position is determined in a cyclic manner starting from a reference position and returning to the reference position again after moving by one integer pixel at a time along a predetermined movement path.

3. The image reading method according to claim 1, further comprising:

recording, by a reading position recording unit, information indicating the determined reading position by associating the information with the read mixed image and the read decimated image.

4. The image reading method according to claim 1, further comprising:

judging, by a motionless judgment unit, whether or not each input image among the plurality of input images is motionless; and determining, by the reading position determination unit, the reading position so that the reading position is moved, only when it is judged that the input image is motionless.

5. An image expansion method of outputting an expanded image created by increasing a resolution of an image, using a mixed image and a decimated image which are read from each input image among a plurality of input images which are captured, said image expansion method comprising:

determining, by a reading position determination unit, for each of the plurality of input images, a reading position of a reading pixel of the mixed image and the decimated image, read from each of the plurality of images, so that the reading position moves an amount which is different for each of the plurality of input images;

reading, by an image reading unit, the mixed image from each of the plurality of input images at the determined reading position, by mixing signals of adjacent pixels; and reading, by the image reading unit, the decimated image from each of the plurality of input images at the determined reading position, by selecting signals of spatially-separated pixels;

calculating, by a positioning unit, an amount of displacement between the mixed images read from each of the plurality of input images, by positioning the mixed images;

compensating, by a displacement compensation unit, for the amount of the displacement based on the amount by which the reading position is moved; and outputting, by an image expansion unit, an expanded image created by increasing the resolution of the image, by reconstructing the decimated images read from the plurality of input images by positioning the decimated images based on the compensated amount of the displacement.

6. The image expansion method according to claim 5, further comprising:

selecting, by a reproduction mode instruction unit, whether or not the image is to be expanded to have a high image quality; and (i) when it is selected that the image is to be expanded to have the high image quality, calculating, by a positioning unit, an amount of displacement between the mixed images read from each of the plurality of input images, by positioning the mixed images;

compensating, by a displacement compensation unit, for the amount of the displacement based on the amount by which the reading position is moved; and outputting, by an image expansion unit, an expanded image created by increasing the resolution of the image, by reconstructing the decimated images read from the plurality of input images by positioning the decimated images based on the compensated amount of the displacement, and (ii) when it is not selected that the image is to be expanded to have the high image quality, outputting the expanded image by increasing the resolution of the image using filtering.

7. An image reading device which reads a mixed image and a decimated image from each input image among a plurality of input images which are captured, said image reading device comprising:

a reading position determination unit operable to determine a reading position of a reading pixel of the mixed image and the decimated image for each of the plurality of input images, so that the reading position moves an amount which is different for each of the plurality of input images; and an image reading unit operable (i) to read the mixed image from each of the plurality of input images at the reading position determined by said reading position determination unit, by mixing signals of adjacent pixels, and (ii) to read the decimated image from each of the plurality of input images at the reading position determined by said reading position determination unit, by selecting signals of spatially-separated pixels.

8. An image expansion device which outputs an expanded image created by increasing a resolution of an image, using a mixed image and a decimated image which are read from each input image among a plurality of input images which are captured, said image expansion device comprising:

a reading position determination unit operable to determine, for each of the plurality of input images, a reading position of a reading pixel of the mixed image and the decimated image, read from each of the plurality of input images, so that the reading position moves an amount which is different for each of the plurality of input images;

an image reading unit operable (i) to read the mixed image from each of the plurality of input images at the reading position determined by said reading position determination unit, by mixing signals of adjacent pixels, and (ii) to read the decimated image from each of the plurality of input images at the reading position determined by said reading position determination unit, by selecting signals of spatially-separated pixels;

a positioning unit operable to calculate an amount of displacement between the mixed images read from the plurality of input images, by positioning of the mixed images;

a displacement compensation unit operable to compensate for the amount of the displacement based on the amount by which the reading position is moved; and an image expansion unit operable to output an expanded image created by increasing the resolution of the image by reconstructing the decimated images read from the plurality of input images by positioning the decimated images based on the compensated amount of the displacement.

9. An integrated circuit which reads a mixed image and a decimated image from each input image among a plurality of input images which are captured, said integrated circuit comprising:

a reading position determination unit operable to determine a reading position of a reading pixel of the mixed image and the decimated image for each of the plurality of input images, so that the reading position moves an amount which is different for each of the plurality of input images; and an image reading unit operable (i) to read the mixed image from each of the plurality of input images at the reading position determined by said reading position determination unit, by mixing signals of adjacent pixels, and (ii) to read the decimated image from each of the plurality of input images at the reading position determined by said reading position determination unit, by selecting signals of spatially-separated pixels.

10. An integrated circuit which outputs an expanded image created by increasing a resolution of an image, using a mixed image and a decimated image which are read from each input image among a plurality of input images which are captured, said integrated circuit comprising:

a reading position determination unit operable to determine, for each of the plurality of input images, a reading position of a reading pixel of the mixed image and the decimated image, read from each of the plurality of input images, so that the reading position moves an amount which is different for each of the plurality of input images;

an image reading unit operable (i) to read the mixed image from each of the plurality of input images at the reading position determined by said reading position determination unit, by mixing signals of adjacent pixels, and (ii) to read the decimated image from each of the plurality of input images at the reading position determined by said reading position determination unit, by selecting signals of spatially-separated pixels;

a positioning unit operable to calculate an amount of displacement between the mixed images read from the plurality of input images, by positioning the mixed images;

a displacement compensation unit operable to compensate for the amount of the displacement based on the amount by which the reading position is moved; and an image expansion unit operable to output an expanded image created by increasing the resolution of the image by reconstructing the decimated images read from the plurality of input images by positioning the decimated images based on the compensated amount of the displacement.

11. A non-transitory computer-readable recording medium on which a program is recorded, the program for reading a mixed image and a decimated image from each input image among a plurality of input images which are captured, said program causing a computer to execute:

determining a reading position of a reading pixel of the mixed image and the decimated image for each of the plurality of input images, so that the reading position moves an amount which is different for each of the plurality of input images;

reading the mixed image from each of the plurality of input images at the determined reading position, by mixing signals of adjacent pixels; and reading the decimated image from each of the plurality of input images at the determined reading position, by selecting signals of spatially-separated pixels.

12. A non-transitory computer-readable recording medium on which a program is recorded, the program for outputting an expanded image created by increasing a resolution of an image, using a mixed image and a decimated image which are read from each input image among a plurality of input images which are captured, said program causing a computer to execute:

determining, for each of the plurality of input images, a reading position of a reading pixel of the mixed image and the decimated image, read from each of the plurality of images, so that the reading position moves an amount which is different for each of the plurality of input images;

reading the mixed image from each of the plurality of input images at the determined reading position, by mixing signals of adjacent pixels; and reading the decimated image from each of the plurality of input images at the determined reading position, by selecting signals of spatially-separated pixels;

calculating an amount of displacement between the mixed images read from each of the plurality of input images, by positioning the mixed images;

compensating for the amount of the displacement based on the amount by which the reading position is moved; and outputting an expanded image created by increasing the resolution of the image, by reconstructing the decimated images read from the plurality of input images by positioning the decimated images based on the compensated amount of the displacement.

* * * * *